(12) United States Patent
Hu et al.

(10) Patent No.: US 11,843,337 B2
(45) Date of Patent: Dec. 12, 2023

(54) COMBINED MOTOR CONTROLLER AND COMBINATION METHOD THEREOF

(71) Applicant: Zhongshan Broad-Ocean Motor Co., Ltd., Zhongshan (CN)

(72) Inventors: Ge Garrett James Hu, Zhongshan (CN); Wenqing Bian, Zhongshan (CN); Hairong Sun, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 267 days.

(21) Appl. No.: 17/517,658

(22) Filed: Nov. 2, 2021

(65) Prior Publication Data

US 2022/0060135 A1 Feb. 24, 2022

Related U.S. Application Data

(63) Continuation-in-part of application No. PCT/CN2020/115751, filed on Sep. 17, 2020, and a
(Continued)

(30) Foreign Application Priority Data

Aug. 7, 2020 (CN) .......................... 202010790572.X
Aug. 7, 2020 (CN) .......................... 202010791463.X
(Continued)

(51) Int. Cl.
*H02K 5/22* (2006.01)
*H04L 12/40* (2006.01)
(Continued)

(52) U.S. Cl.
CPC ............. *H02P 27/08* (2013.01); *H02K 5/225* (2013.01); *H02K 11/33* (2016.01); *H04L 12/40* (2013.01);
(Continued)

(58) Field of Classification Search
CPC .......... H02P 27/00; H02P 27/04; H02P 27/06; H02P 27/08; H02P 2205/07; H02P 1/26;
(Continued)

(56) References Cited

U.S. PATENT DOCUMENTS 6,462,976 B1 * 10/2002 Olejniczak .............. H02M 1/00
257/E23.178
6,750,573 B1    6/2004 Schmidt et al.

FOREIGN PATENT DOCUMENTS

CN         1815864 A     8/2006
CN         1987705 A     6/2007
(Continued)

*Primary Examiner* — Antony M Paul
(74) *Attorney, Agent, or Firm* — MATTHIAS SCHOLL P.C.; Matthias Scholl

(57) ABSTRACT

A combined motor controller, including: a first function module, including at least one power module powered by the mains supply to output a VDC power supply to power other modules; a second function module, including at least one motor control module including a microprocessor control unit (MCU) and an IGBT inverter; and a third function module, including at least one I/O module configured to transmit signals between a system main control board or a peripheral device and the motor control module. Each function module is provided with an independent metal or plastic shell and a first circuit board located in the shell, and the first function module, the second function module and the third function module are connected by mutually matched connectors for power supply or control signal transmission between the function modules.

17 Claims, 30 Drawing Sheets

Related U.S. Application Data continuation-in-part of application No. PCT/CN2020/115752, filed on Sep. 17, 2020.

(30) Foreign Application Priority Data

| Aug. 7, 2020 | (CN) | ................ 202021631386.3 |
| Aug. 7, 2020 | (CN) | ................ 202021632574.8 |

(51) Int. Cl.
  *H02K 11/33* (2016.01)
  *H02P 27/08* (2006.01)

(52) U.S. Cl.
  CPC  *H02K 2211/03* (2013.01); *H04L 2012/40215* (2013.01)

(58) Field of Classification Search
  CPC ...... H02P 1/24; H02P 1/42; H02P 1/54; H02P 6/04; H02P 6/08; H02P 7/29; H02P 21/00; H02P 21/18; H02P 21/20; H02P 21/04; H02P 23/07; H02P 23/14; H02P 6/14; H02P 3/24; H02P 9/30; H02K 11/33; H02K 5/225; H02K 11/0094; H02K 2211/03; H02K 11/21; H02K 2213/12; H04L 12/40; H04L 2012/40215; H02M 1/08; F25B 2600/11; F25B 49/025; H01G 17/00; H02H 3/087; H01L 2224/49111; H01L 23/3114; H01L 2924/13055

See application file for complete search history.

(56) References Cited

FOREIGN PATENT DOCUMENTS

| CN | 101799689 A | 8/2010 |
| CN | 104579029 A | 4/2015 |
| CN | 104590550 A | 5/2015 |
| CN | 105278371 A | 1/2016 |
| CN | 107248834 A | 10/2017 |
| CN | 209676083 U | 11/2019 |
| JP | 2008290615 A | 12/2008 |
| KR | 101951642 B1 | 2/2019 |

\* cited by examiner

COMBINED MOTOR CONTROLLER AND COMBINATION METHOD THEREOF

CROSS-REFERENCE TO RELATED APPLICATIONS

This application is a continuation-in-part of International Patent Application No. PCT/CN2020/115751 with an international filing date of Sep. 17, 2020 and International Patent Application No. PCT/CN2020/115752 with an international filing date of Sep. 17, 2020, designating the United States, now pending, and further claims foreign priority benefits to Chinese Patent Application No. 202010790572.X filed Aug. 7, 2020, to Chinese Patent Application No. 202021631386.3 filed Aug. 7, 2020, to Chinese Patent Application No. 202010791463.X filed Aug. 7, 2020, and to Chinese Patent Application No. 202021632574.8 filed Aug. 7, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a combined motor controller and a combination method thereof.

In recent years, indoor units of different brands of Heating Ventilation Air Conditioning (HVAC) and other indoor units in the field of HVAC generally includes a centrifugal blower motor, an induced draft fan, a compressor motor and an axial fan motor, and the voltage, power, signal communication, speed, torque and other parameters of these motors are all different, which require the mutual matching of motors produced by different manufacturers. As shown in FIGS. 2, 3 and 4, these motors, if being brushless direct current (BLDC) motors or electronically commutated motors (ECM), generally come with a motor body $1a$ and a motor controller $2a$. The motor body $1a$ includes a stator $12a$, a rotor $13a$, a motor casing $11a$ and a bearing, and the motor controller $2a$ generally includes a control box $21a$, and a control circuit board $22a$ on which all function circuits are basically integrated. Traditionally, one or several motor products are produced by the same manufacturer, with controllers thereof also produced by this manufacturer. However, it is necessary to replace the entire motor controller or even the entire motor once a certain function component of the controller fails, which brings great inconvenience to the after-sales maintenance market and leads to high maintenance costs.

Moreover, the traditional production method of motor controllers is poor in compatibility and universality, that is, all function components of the motor controller are integrated on one or two circuit boards, which loses the flexibility instead. As different customers may need different motors and motor controllers, e.g., 5-position PWM motors, 0-10 VDC motors, 0-10 VD+C 10-position motors; in some cases, only one motor of an outdoor unit needs to be controlled; in other cases, a plurality of motors of the outdoor unit needs to be controlled simultaneously; some require 5 HP motor controllers and some require 3 HP motor controllers; the circuit board and the control box in the motor controller are fixed in size and the functions of the circuit board are also fixed, resulting in poor compatibility and long production cycle and development cycle. The motor manufacturers have to independently design motor controllers corresponding to different motors required by customers, and to newly develop and produce the controllers based on the customer needs, which brings great inconvenience to the production and sales of motors.

SUMMARY

The disclosure provides a combined motor controller, comprising:
  a first function module, comprising at least one power module powered by the mains supply to output a VDC power supply to power other modules;
  a second function module, comprising at least one motor control module comprising a microprocessor control unit (MCU) and an IGBT inverter, where one motor control module controls one motor body, and the motor control module powered by the VDC power supply is configured to receive external input control signals and output power to the motor body, so as to control speed or torque or air flow of the motor body; and
  a third function module, comprising at least one I/O module configured to transmit signals between a system main control board or a peripheral device and the motor control module.

Each function module is provided with an independent metal or plastic shell and a first circuit board located in the shell, and the first function module, the second function module and the third function module are connected by mutually matched connectors for power supply or control signal transmission between the function modules.

The combined motor controller further comprises:
  a fourth function module, comprising a redundancy control module configured to automatically enable a backup function module when the first function module, the second function module or the third function module fails, so as to ensure that a client system can still operate smoothly;
  a fifth function module, comprising the backup function module having the same function as the first function module, the second function module or the third function module, wherein one or more backup function modules are provided to meet the customer needs, and the above function modules are combined to form a motor control unit; and
  the fourth function module and the fifth function module are both provided with an independent metal or plastic shell and a first circuit board located in the shell; and the first function module, the second function module, the third function module, the fourth function module and the fifth function module are connected by mutually matched connectors.

The redundancy control module comprises a redundancy control MCU, a plurality of relays, a display circuit and a bus communication connecting circuit, and the redundancy control MCU of the circuit is communicated with other function modules by bus communication; the redundancy control MCU automatically enables the backup function module by the plurality of relays; and the display circuit is configured to display the status of other function modules.

The first function module, the third function module and the backup function module are all further provided with a network communication unit comprising a bus communication MCU, a communication bus connecting circuit and a function detection circuit; the function detection circuit is configured to detect the status of its respective module and transmit signals to the bus communication MCU; and the bus communication MCU is connected to a data bus by the communication bus connecting circuit for data transmission with the redundancy control MCU.

The I/O module is subdivided into multiple types depending on functions, comprising at least one of:
- a multi-position 24 VAC input module which receives a 24 VAC position signal from a main control board of a client and transmits the signal to the motor control module;
- a PWM input module which receives a PWM signal from the main control board of the client and transmits the signal to the motor control module;
- a 0-10 VDC input module which receives a 0-10 VDC signal from the main control board of the client and transmits the signal to the motor control module;
- a serial communication module based on RS485 which requires the motor control module to be provided with corresponding drivers to be compatible with different communication protocols;
- a Bluetooth wireless communication module which allows users to communicate wirelessly with the motor control module through a mobile App or a PC for configuration and diagnosis;
- a pulse output module which outputs pulses for the main control board of the client to monitor a certain parameter of the motor;
- an Ethernet LAN module which supports common TCP/IP protocols, and is configured to connect the motor control module to bring the motor control module under building network control or remotely control and monitor the parameter status of the motor through the Internet;
- a Human Machine Interface (HMI) function module which is provided with a basic monochrome HMI or an advanced high-definition color screen according to the market segmentation, allowing users to control the motor directly, to control the speed/torque/air flow of the motor in real time or to perform configuration and diagnosis, and the HMI function module can even be used in laboratory tests; and
- a dip switch module which is connected to the motor control module by connectors, and several dip switches are provided in a row for users to change the parameters of the motor in real time.

The function modules are connected to each other by mutually matched connectors, i.e., the function modules can be flexibly arranged in different positions and connected by flexible flat cables.

All the function modules are lined up and then installed on a din rail, and are connected together by flexible flat cables, allowing users to arrange the function modules vertically or horizontally or to distribute the function modules in different positions.

All the function modules are fixed on a base in which a second circuit board is provided for power supply and control of signal transmission between the function modules.

The function modules are connected to each other by mutually matched connectors, i.e., the function modules get close together by plugging male connectors into female connectors to save space.

There are two second function modules which control two motor bodies to form a motor controller of an indoor unit or an outdoor unit respectively.

One or more backup function modules serve as backups for the power module, the motor control module and the I/O module.

A combination method of a motor controller is provided, the method comprising subdividing the motor controller into a plurality of function modules, and the plurality of function modules comprising:
- a first function module, which is a power module connected to the mains supply to output a corresponding DC power supply to power other modules, wherein there are a plurality of power modules of different sizes according to different voltage and motor power requirements;
- a second function module, which is a motor control module comprising a microprocessor control unit (MCU) and an IGBT inverter, wherein one motor control module controls one motor body, and the motor control module powered by the VDC power supply is configured to receive external input control signals and output power to the motor body, so as to control speed or torque or air flow of the motor body; there are a plurality of motor control modules of different sizes depending on motor power;
- a third function module, which is an I/O module configured to transmit signals between a system main control board or a peripheral device and the motor control module, wherein there may be at least one third function module or may be several types of third function modules combined according to communication requirements to realize signal transmission between the system main control board or the peripheral device and the motor control module; and
- the at least one power module, the at least one motor control module and the at least one I/O module matched with parameters for controlling motors are selected, combined, and connected together to form a combined motor controller.

The motor controller further comprises:
- a fourth function module, which is a redundancy control module configured to automatically enable a backup function module when the first function module, the second function module or the third function module fails, so as to ensure that a client system can still operate smoothly;
- a fifth function module, which is the backup function module having the same function as the first function module, the second function module or the third function module, wherein one or more backup function modules are provided to meet the customer needs, and the above function modules are combined to form a motor control unit; and
- the first function module, the second function module, the third function module, the fourth function module and the fifth function module are all provided with an independent metal or plastic shell and a first circuit board located in the shell, and are connected by mutually matched connectors.

The I/O module is subdivided into multiple types depending on functions, and at least one of following I/O modules is selected for combinations according to requirements:
- a multi-position 24 VAC input module which receives a 24 VAC position signal from a main control board of a client and transmits the signal to the motor control module;
- a PWM input module which receives a PWM signal from the main control board of the client and transmits the signal to the motor control module;
- a 0-10 VDC input module which receives a 0-10 VDC signal from the main control board of the client and transmits the signal to the motor control module;

a serial communication module based on RS485 which requires the motor control module to be provided with corresponding drivers to be compatible with different communication protocols;

a Bluetooth wireless communication module which allows users to communicate wirelessly with the motor control module through a mobile App or a PC for configuration and diagnosis;

a pulse output module which outputs pulses for the main control board of the client to monitor a certain parameter of the motor;

an Ethernet LAN module which supports common TCP/IP protocols, and is configured to connect the motor control module to bring the motor control module under building network control or remotely control and monitor the parameter status of the motor through the Internet;

a Human Machine Interface (HMI) function module which is provided with a basic monochrome HMI or an advanced high-definition color screen according to the market segmentation, allowing users to control the motor directly, to control the speed/torque/air flow of the motor in real time or to perform configuration and diagnosis, and the HMI function module can even be used in laboratory tests; and a dip switch module which is connected to the motor control module by connectors, and several dip switches are provided in a row for users to change the parameters of the motor in real time.

The function modules are connected to each other by mutually matched connectors, i.e., the function modules can be flexibly arranged in different positions and connected by flexible flat cables. Each function module is a rectangular shell of uniform height and depth and different width. All the function modules are lined up leaving no gap between two adjacent modules and then installed on a din rail.

The function modules are connected to each other by mutually matched connectors, i.e., the function modules can be flexibly arranged in different positions and connected by flexible flat cables. All the function modules are fixed on a base designed as a purely mechanical mounting base.

All the function modules are fixed on a base designed as a purely mechanical mounting base, and a bus interface is additionally provided on the purely mechanical mounting base for power supply or control signal transmission between the function modules.

The following advantages are associated with the combined motor controller of the disclosure.

The production method of the combined modules is flexible, convenient and strongly adaptable and can shorten the research and development cycle, so that the combined modules can be produced conveniently and efficiently, and can be easily replaced in case a certain function module fails during after-sales maintenance, thus reducing the maintenance cost and realizing convenient and efficient maintenance.

DETAILED DESCRIPTION

To further illustrate, embodiments detailing a combined motor controller are described below. It should be noted that the following embodiments are intended to describe and not to limit the disclosure.

Embodiment 1

Figure 1:
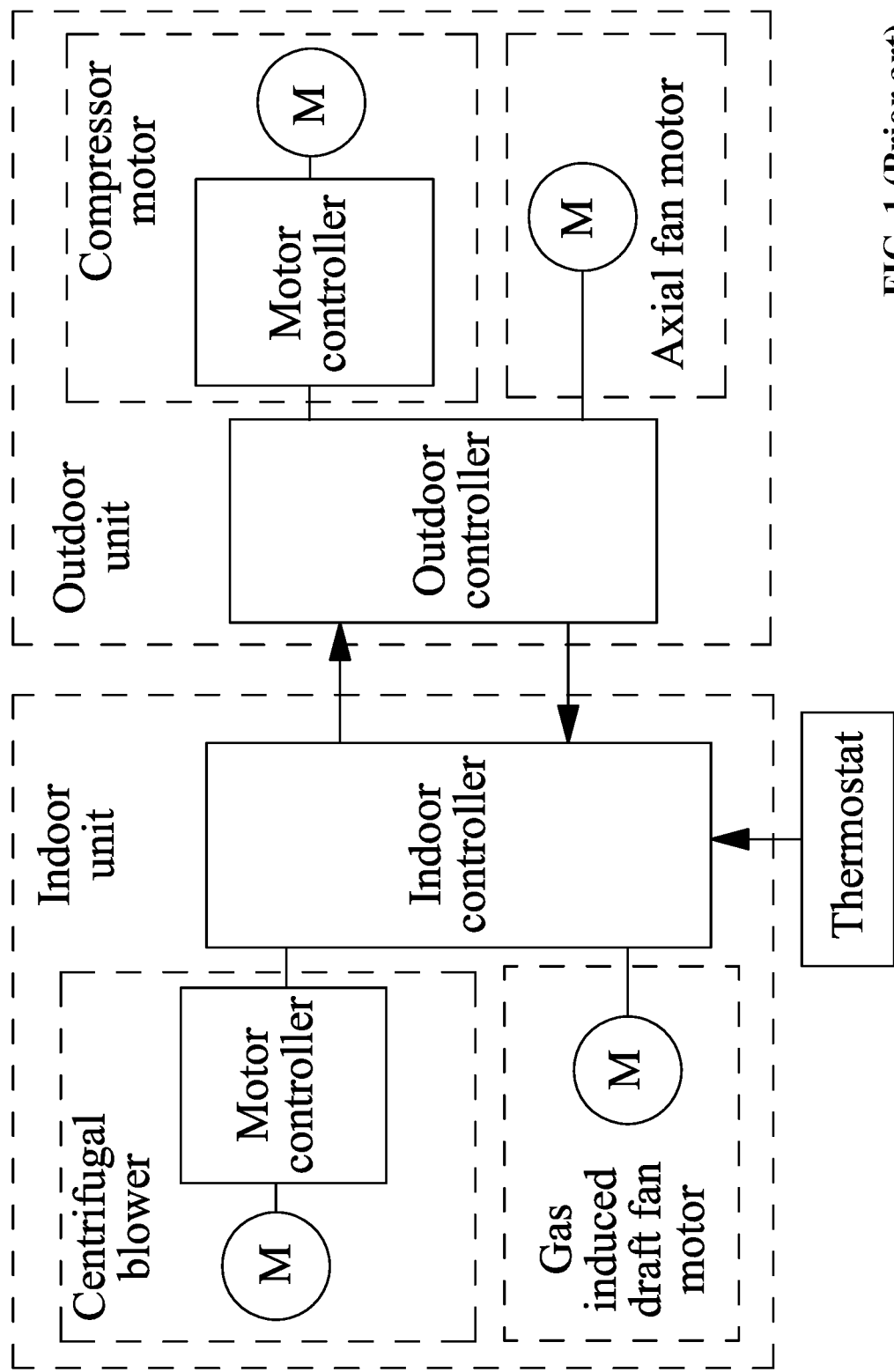
FIG. 1 is a block diagram of an HVAC system in the related art.
Figure 2:
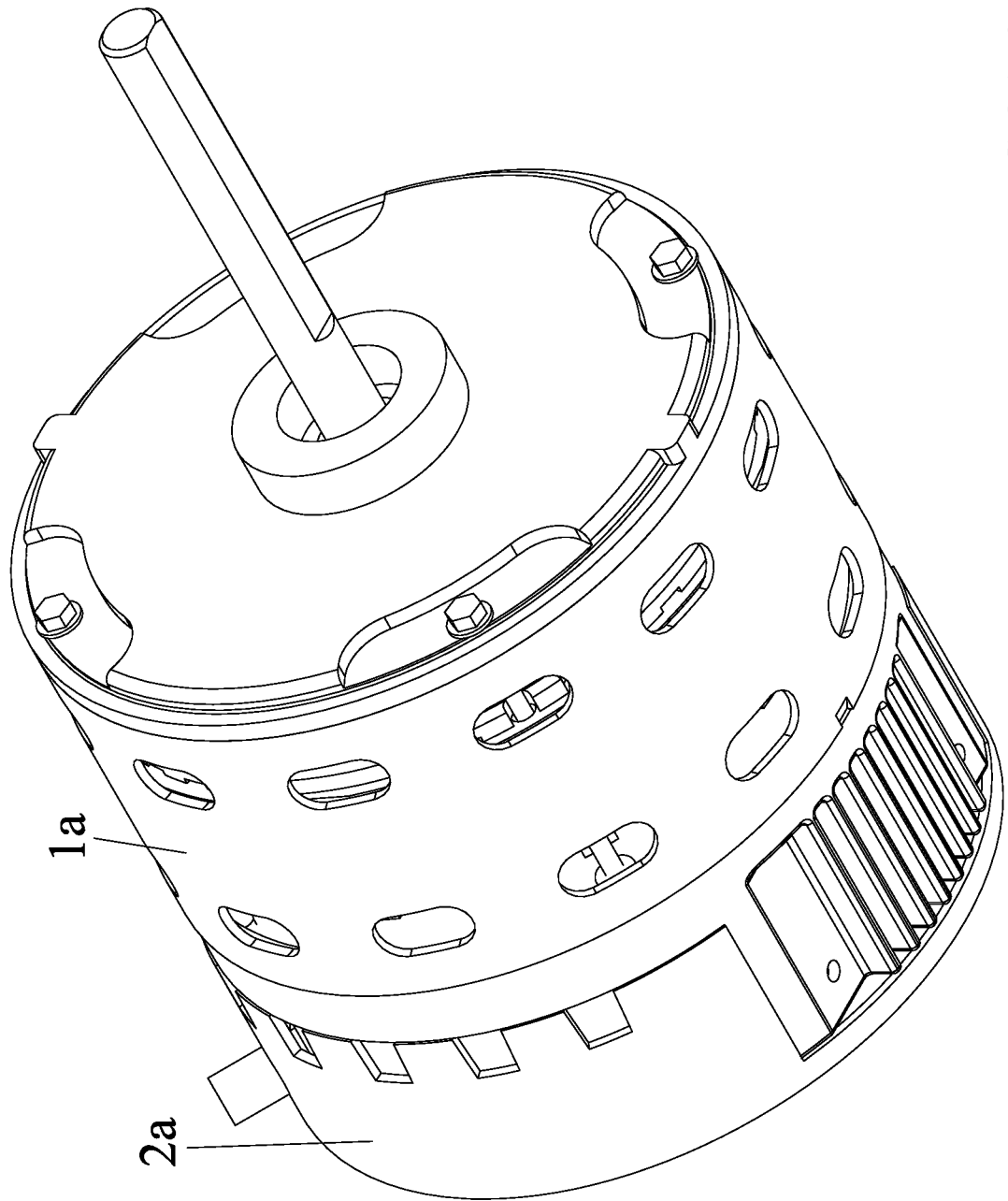
FIG. 2 is a perspective view of a BLDC motor in the related art.
Figure 3:
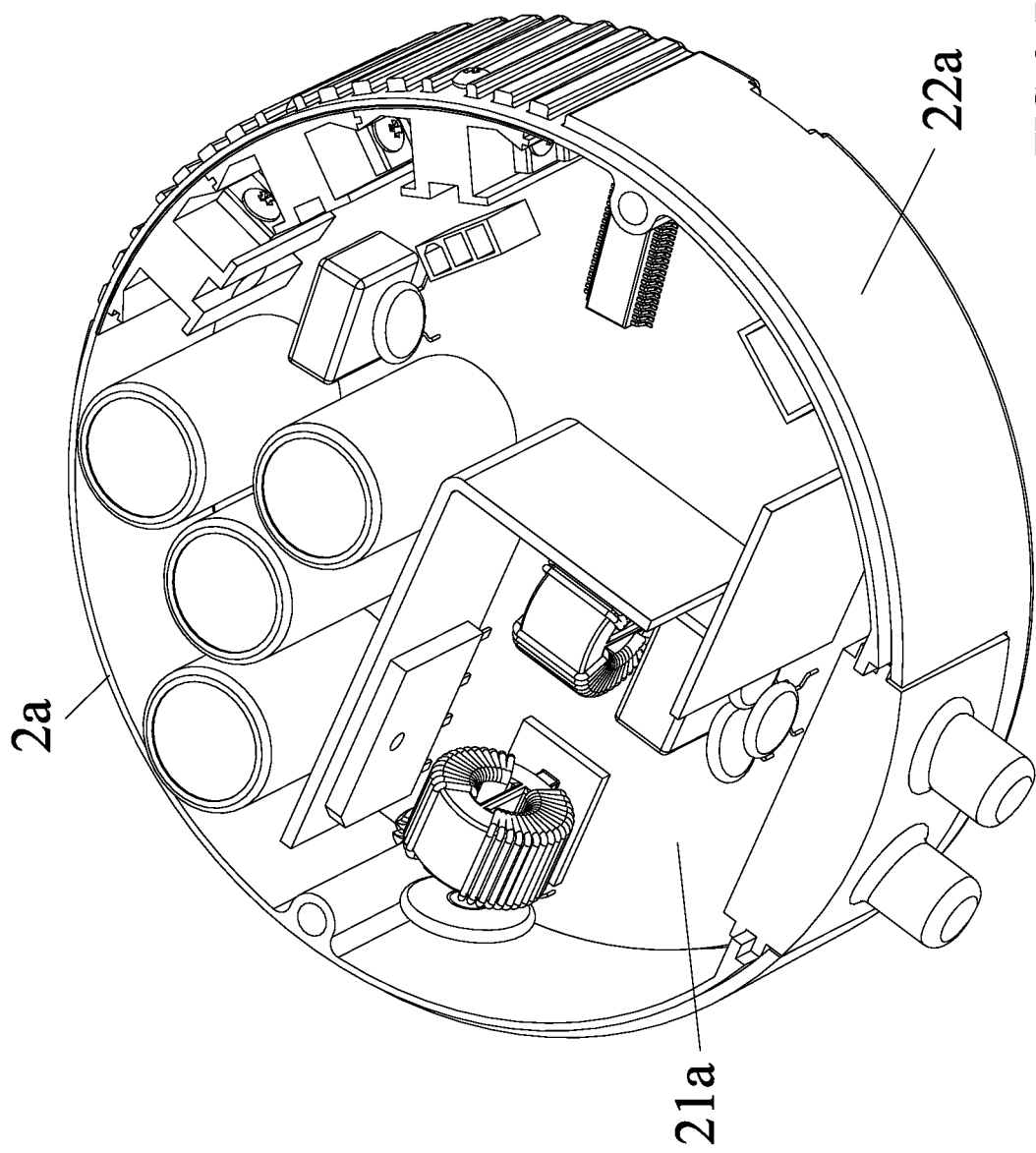
FIG. 3 is a perspective view of a motor controller of the BLDC motor in the related art.
Figure 4:
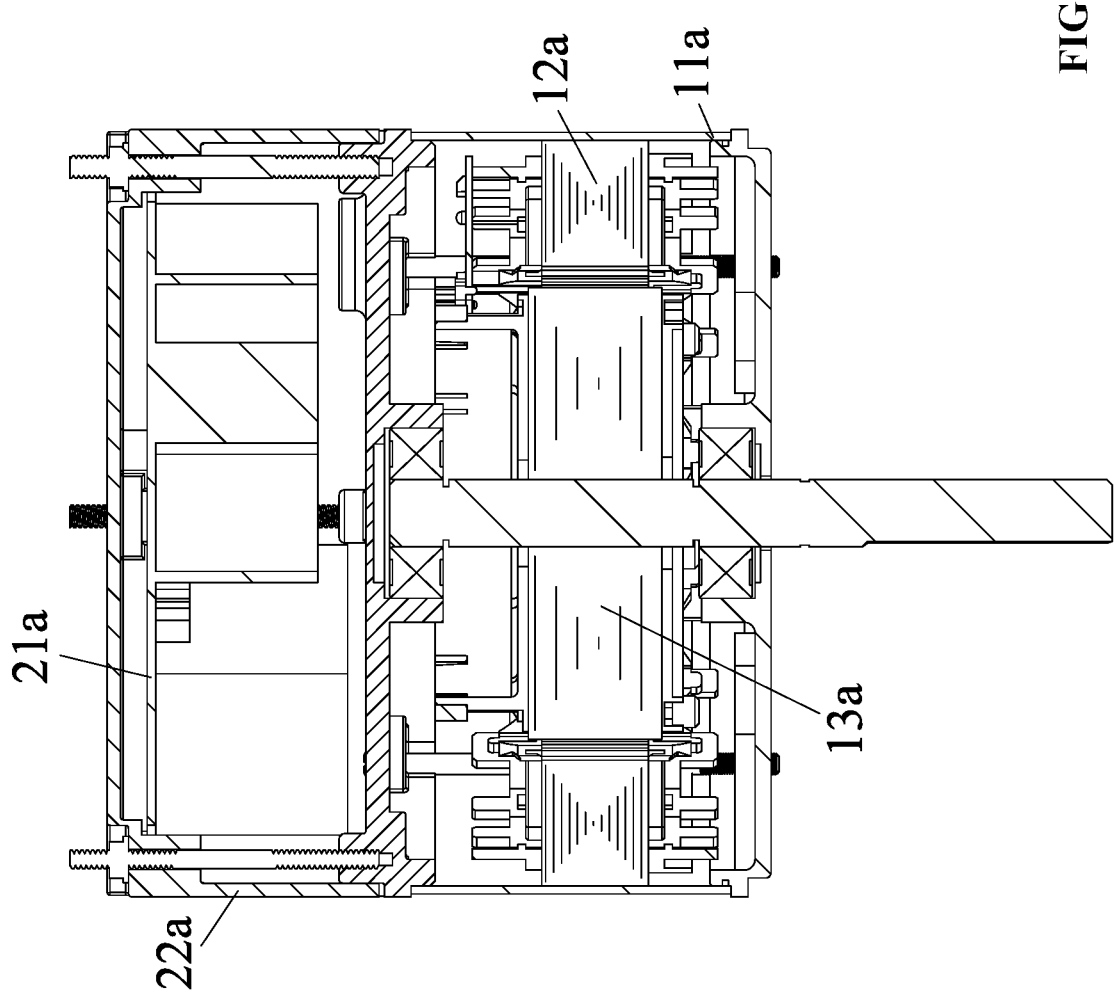
FIG. 4 is a sectional view of the BLDC motor in the related art.
Figure 5:
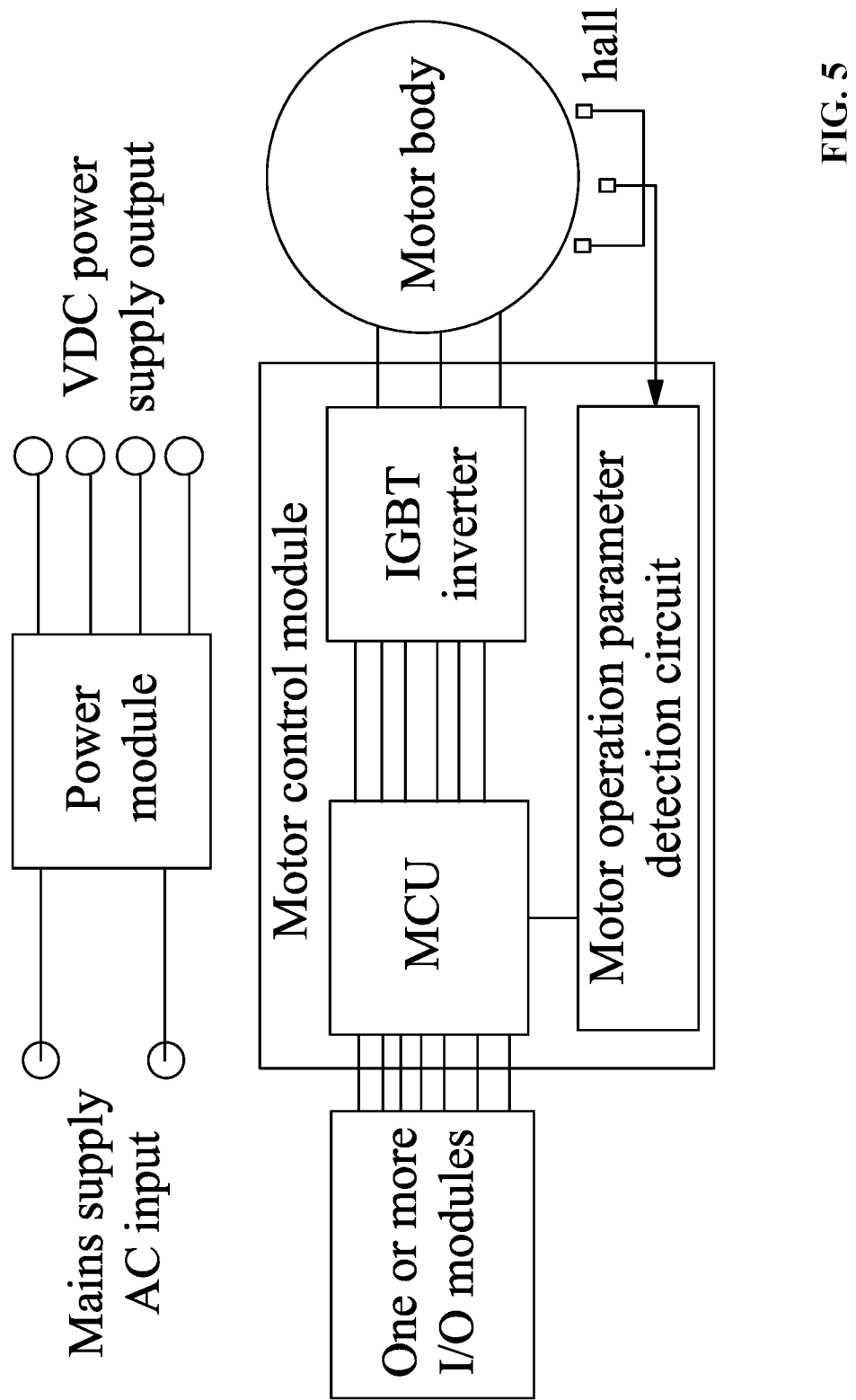
FIG. 5 is a structure block diagram according to an embodiment 1 of the disclosure.

As shown in FIG. 5, the disclosure provides a combined motor controller, comprising following modules:

a first function module is a power module powered by the mains supply to output a VDC power supply to power other modules;

a second function module is a motor control module comprising a microprocessor control unit (MCU), an IGBT inverter and a radiator; one motor control module controls one motor body, and the motor control module powered by the VDC power supply is configured to receive external input control signals and output a three-phase (or multi-phase) UVW power supply to the motor body, so as to control speed or torque or air flow of the motor body; and a third function module is an I/O module configured to transmit signals between a system main control board or a peripheral device and the motor control module; there may be at least one third function module or may be several types of third function modules combined according to communication requirements to realize signal transmission between the system main control board or the peripheral device and the motor control module.

Each function module is provided with an independent metal or plastic shell and a first circuit board located in the shell, and all the function modules are connected to each other by mutually matched connectors for power supply or control signal transmission between the function modules, and the radiator is located inside or outside the shell.

The production method of the combined modules is flexible, convenient and strongly adaptable and can shorten the research and development cycle, so that the combined modules can be produced conveniently and efficiently, and can be easily replaced in case a certain function module fails during after-sales maintenance, thus reducing the maintenance cost and realizing convenient and efficient maintenance. Advantages of the combined design over the existing integrated design are as follows. If there is a need to additionally install a new function module or to upgrade hardware or software to repair defects and enhance functions of an existing function module in the future, in principle, it needs to design and modify the function module only and to update a driver of the motor control module at most to support the new function. Modules that are not modified can continue to be produced and sold as is. In this way, the method of decomposing the functions of the original motor into different function modules shortens the new product development cycle or reduces the effort in modifying existing designs, while ensuring that all or most of the existing designs remain useful.

Figure 13:
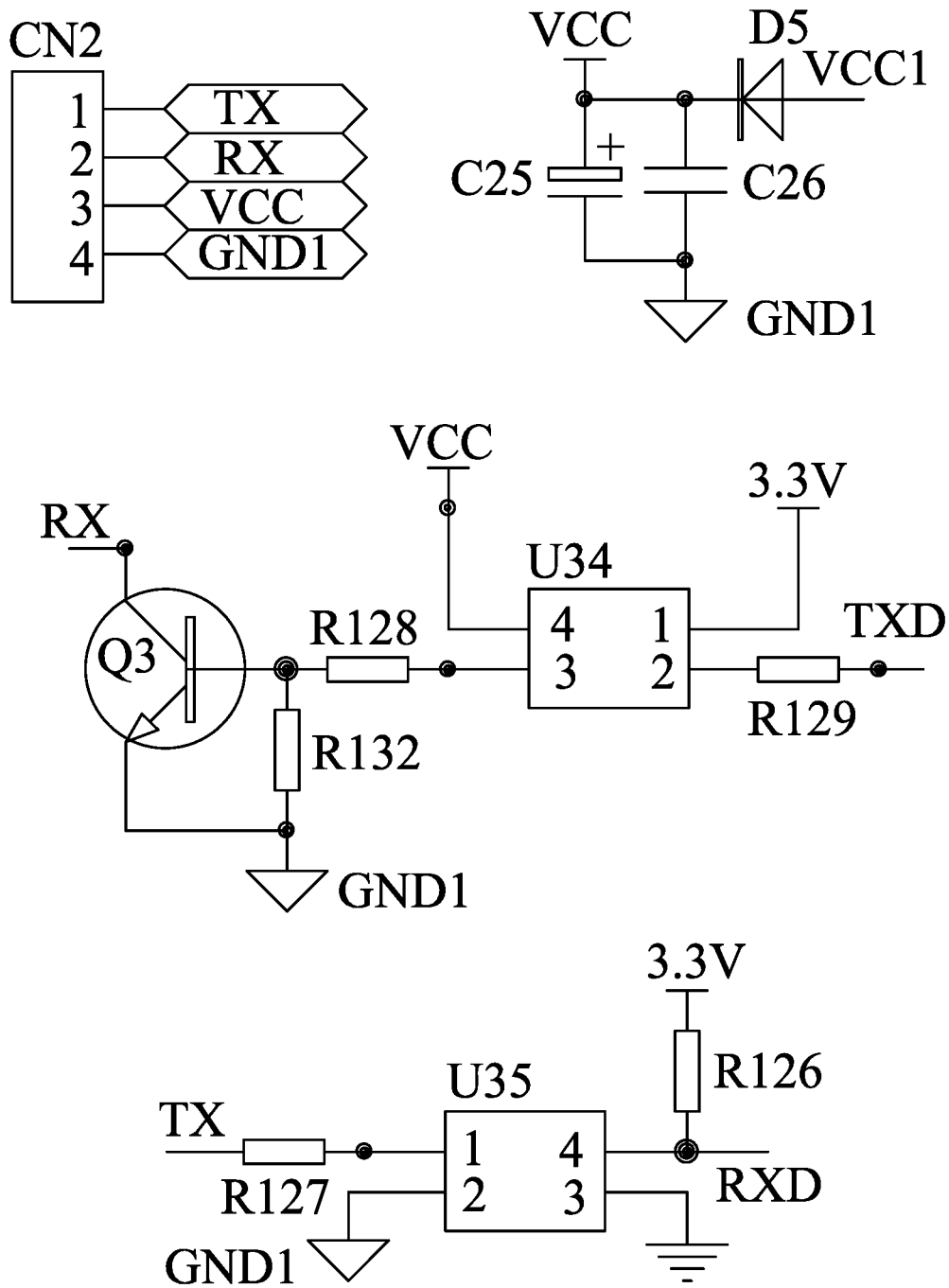
FIG. 13 are circuit diagrams of a serial communication module according to Example 1 of the disclosure.
Figure 14:
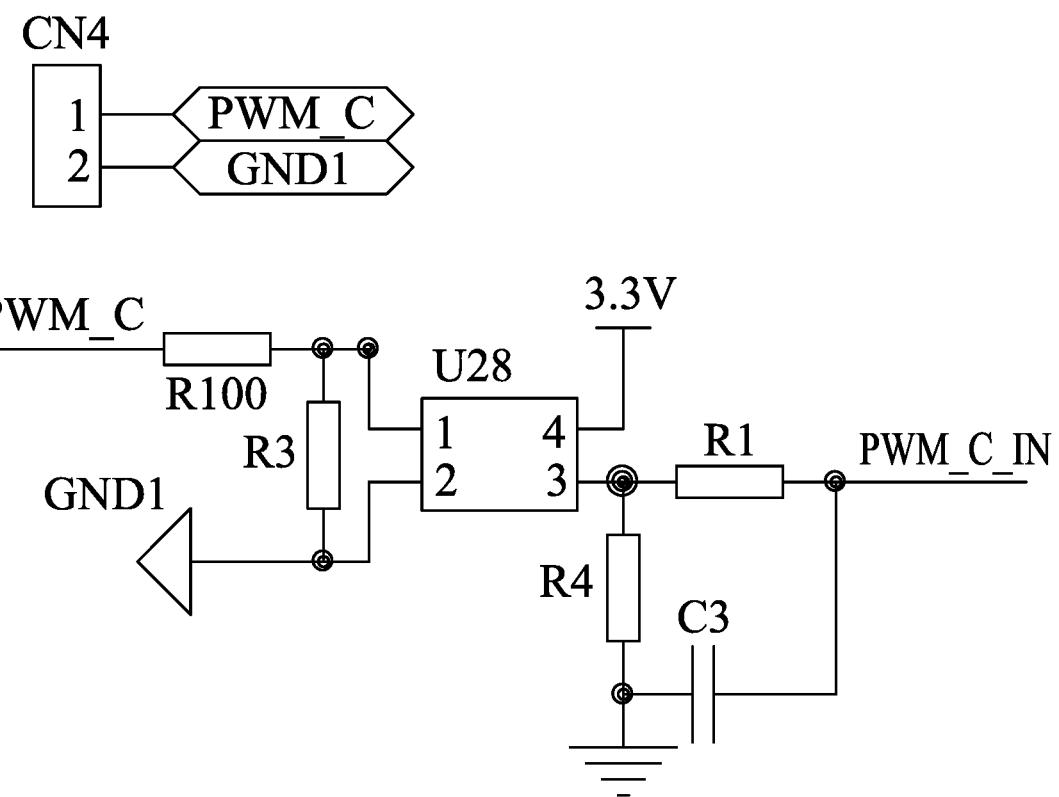
FIG. 14 are circuit diagrams of a PWM input module according to Example 1 of the disclosure.
Figure 15:
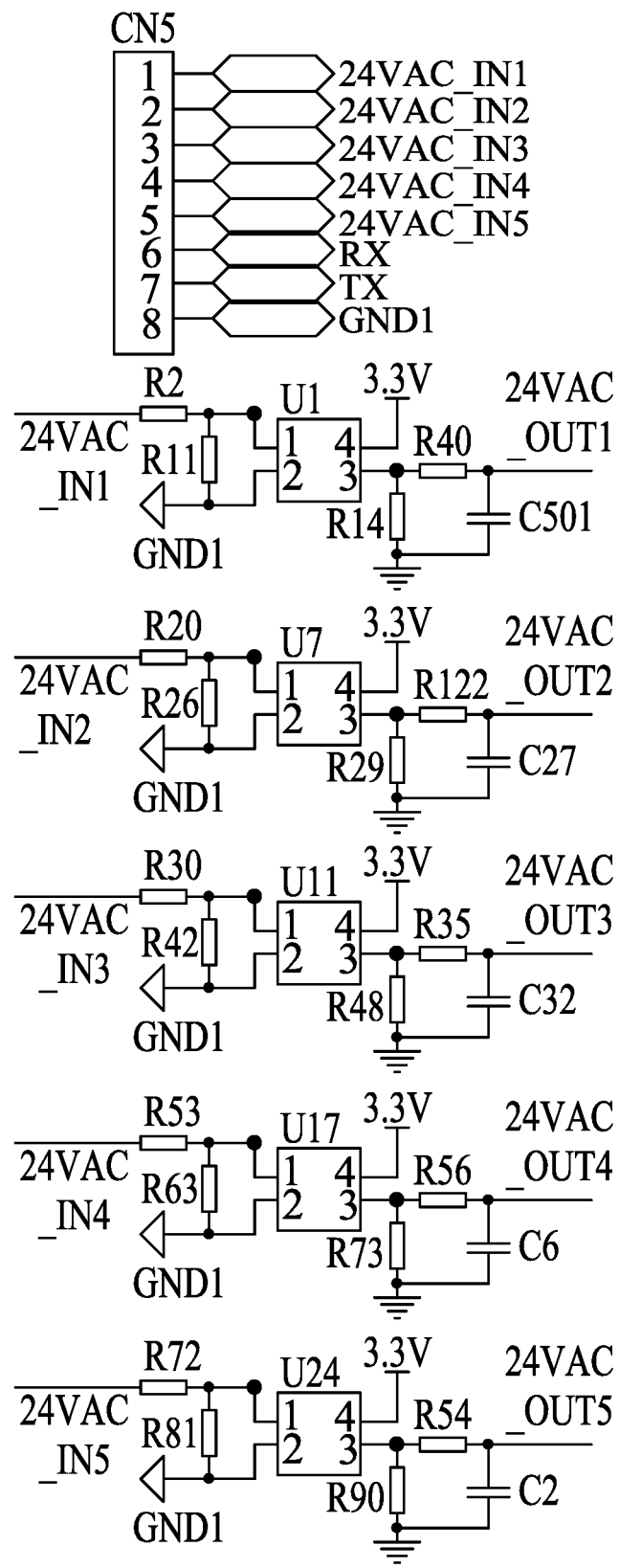
FIG. 15 are circuit diagrams of a 5-position 24 VAC input module according to Example 1 of the disclosure.

The I/O module is subdivided into multiple types depending on functions, comprising at least one of following modules:

a multi-position 24 VAC input module (Part No. C101) receives a 24 VAC position signal from a main control board of a client and transmits the signal to the motor control module; circuit of a 5-position 24 VAC input module are shown in FIG. 15;

a PWM input module (Part No. C102) receives a PWM signal from the main control board of the client and transmits the signal to the motor control module; a circuit structure is shown in FIG. 14;

a 0-10 VDC input module (Part No. C103) receives a 0-10 VDC signal from the main control board of the client and transmits the signal to the motor control module; as it is a general function module, no circuit diagram is provided;

a serial communication module (Part No. C104) based on RS485 requires the motor control module to be provided with corresponding drivers to be compatible with different communication protocols; circuit structures of the serial communication module are shown in FIG. 13;

a Bluetooth wireless communication module (Part No. C105) allows users to communicate wirelessly with the motor control module through a mobile App or a PC for configuration and diagnosis; as the Bluetooth wireless communication module is a general function module, no circuit diagram is provided;

a pulse output module (Part No. C106) outputs pulses for the main control board of the client to monitor a certain parameter of the motor; the pulse output module employs a general circuit, and no circuit diagram is provided;

an Ethernet LAN module (Part No. D101) supports common TCP/IP protocols, and is configured to connect the motor control module to bring the motor control module under building network control or remotely control and monitor the parameter status of the motor through the Internet; the Ethernet LAN module is provided with an independent metal or plastic shell and a first circuit board located in the shell, and is connected to other function modules by mutually matched connectors for power supply or control signal transmission between the function modules; the Ethernet LAN module is communicated with the MCU in the motor control module so that the network functions of the motor can be expanded for remote diagnosis and maintenance, control and management;

a Human Machine Interface (HMI) function module (Part No. E101) is provided with a basic monochrome HMI or an advanced high-definition color screen according to the market segmentation, allowing users to control the motor directly, to control the speed/torque/air flow of the motor in real time or to perform configuration and diagnosis, and the HMI function module can even be used in laboratory tests; the HMI function module is provided with an independent metal or plastic shell and a first circuit board located in the shell, and is connected to other function modules by mutually matched connectors for power supply or control signal transmission between the function modules; the HMI function module is communicated with the motor control module, which is easy for customers to debug the motor and thus brings great convenience to customers; and a dip switch module (Part No. F101) is connected to the motor control module by connectors, and several dip switches are provided in a row for users to change the parameters of the motor in real time; the dip switch module is communicated with the motor control module, which facilitates changing the parameters of the motor and debugs the motor faster.

The above I/O module is subdivided into multiple types, which are flexible and convenient to adapt to different customer needs.

Figure 6:
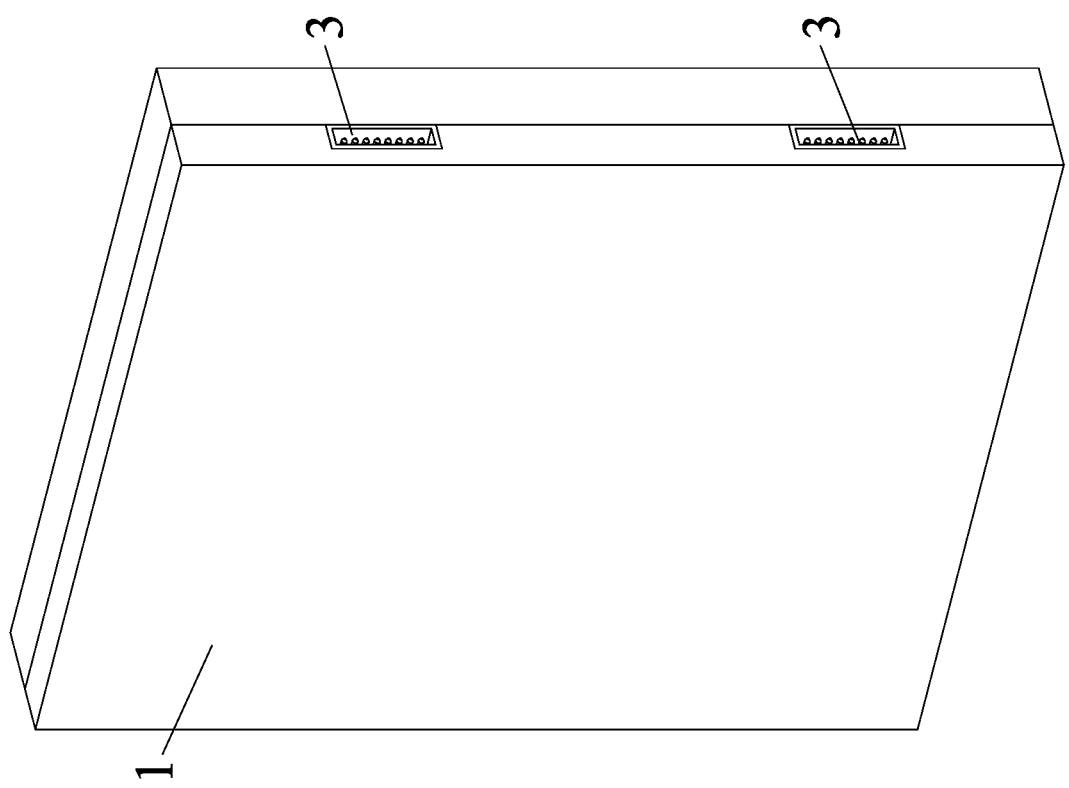
FIG. 6 is a perspective view of a function module from an angle according to Example 1 of the disclosure.
Figure 7:
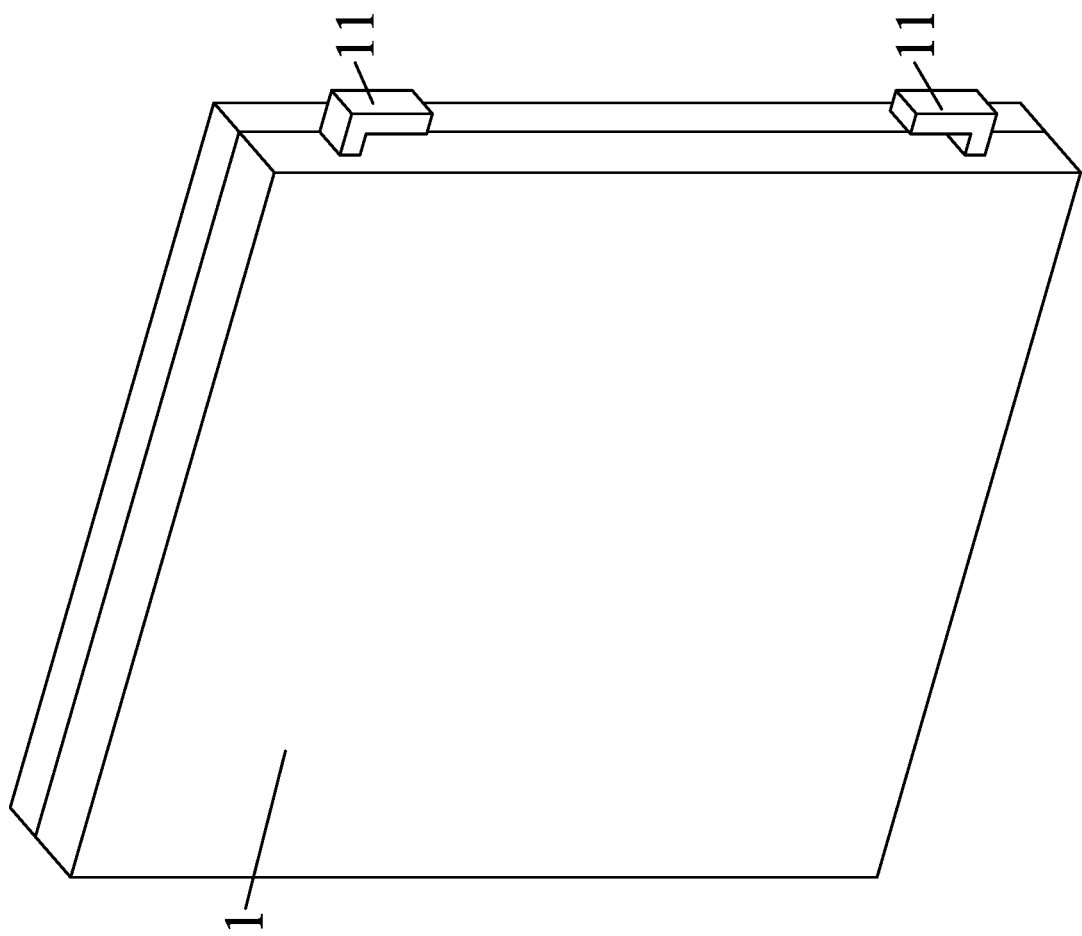
FIG. 7 is a perspective view of the function module from another angle according to Example 1 of the disclosure.
Figure 8:
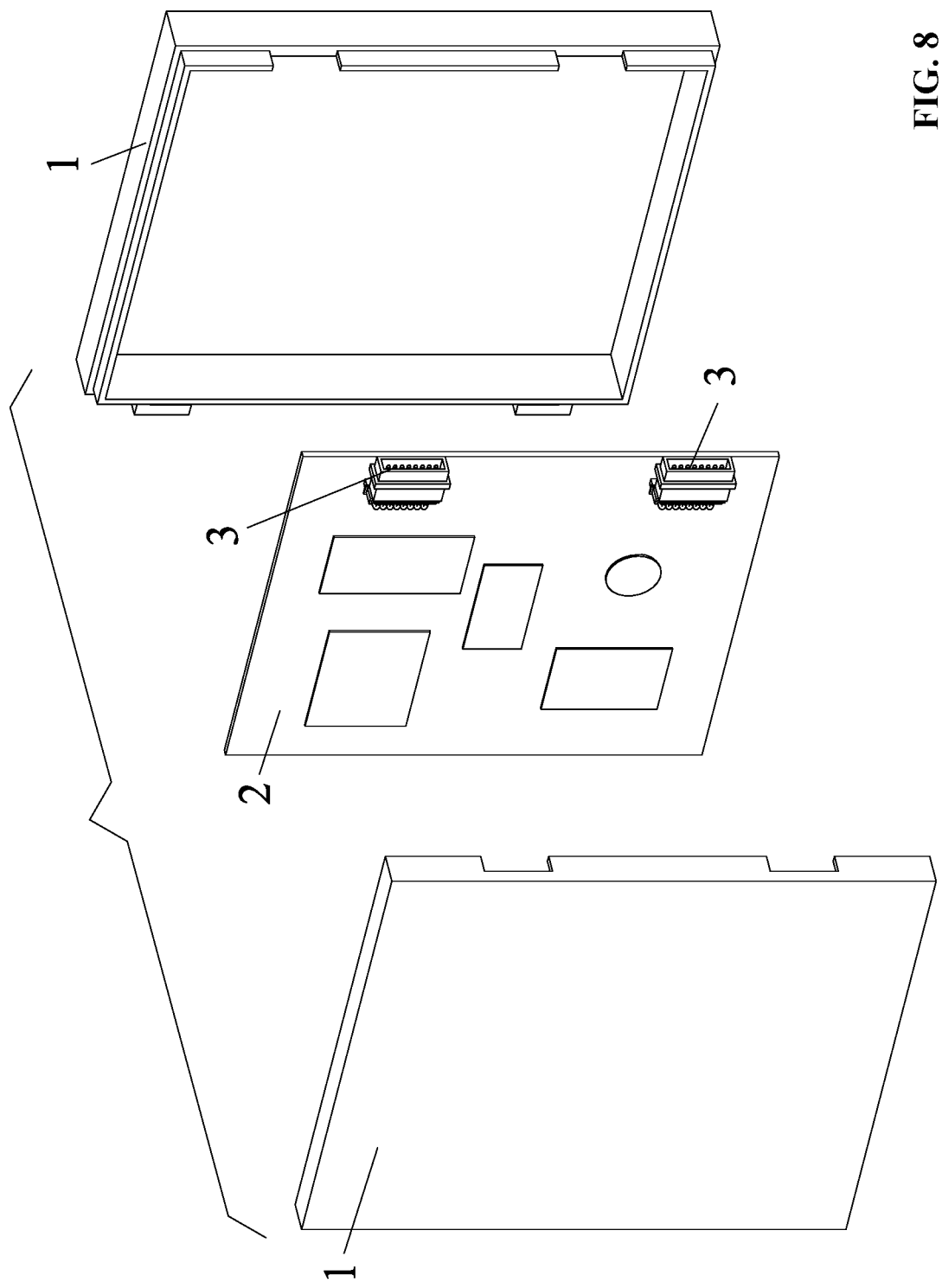
FIG. 8 is an exploded view of the function module according to Example 1 of the disclosure.
Figure 9:
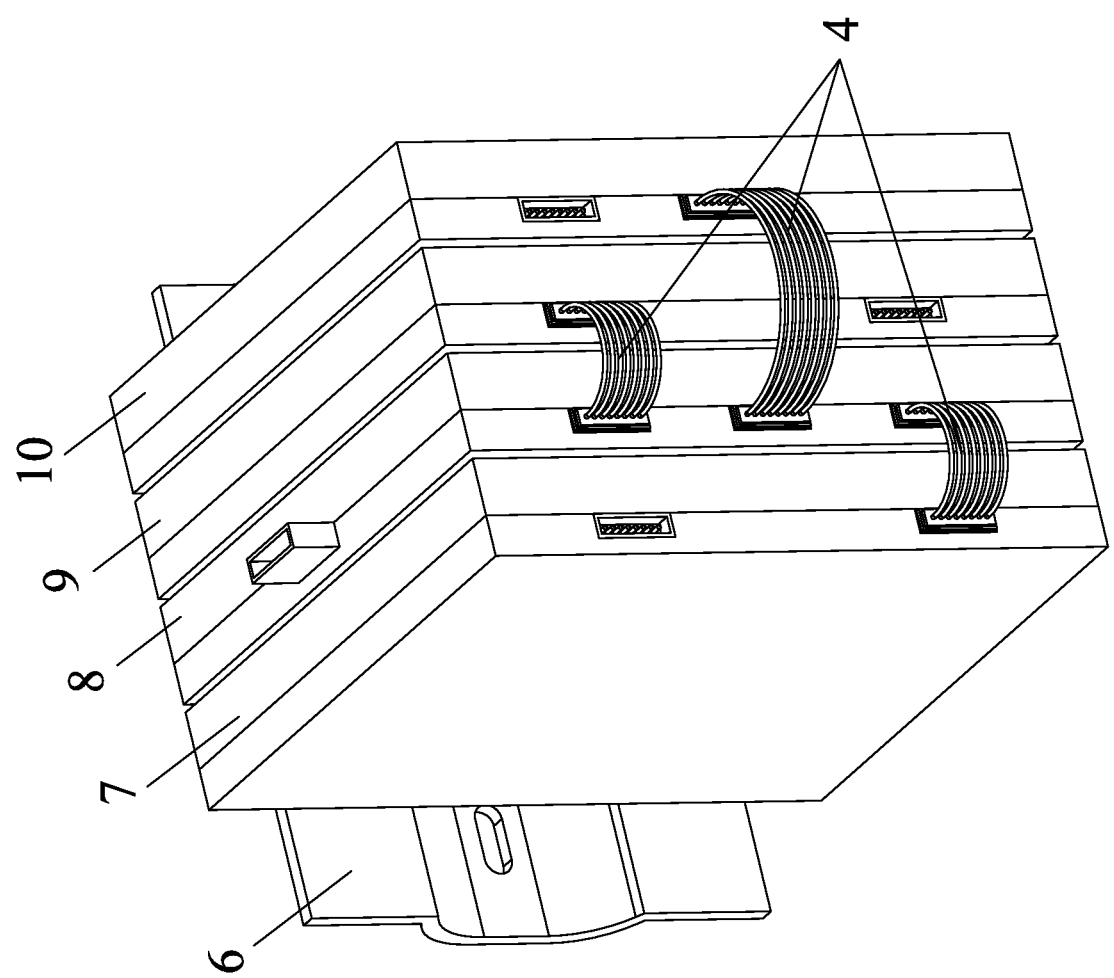
FIG. 9 is a perspective view of a combined motor controller from an angle after assembly according to Example 1 of the disclosure.
Figure 10:
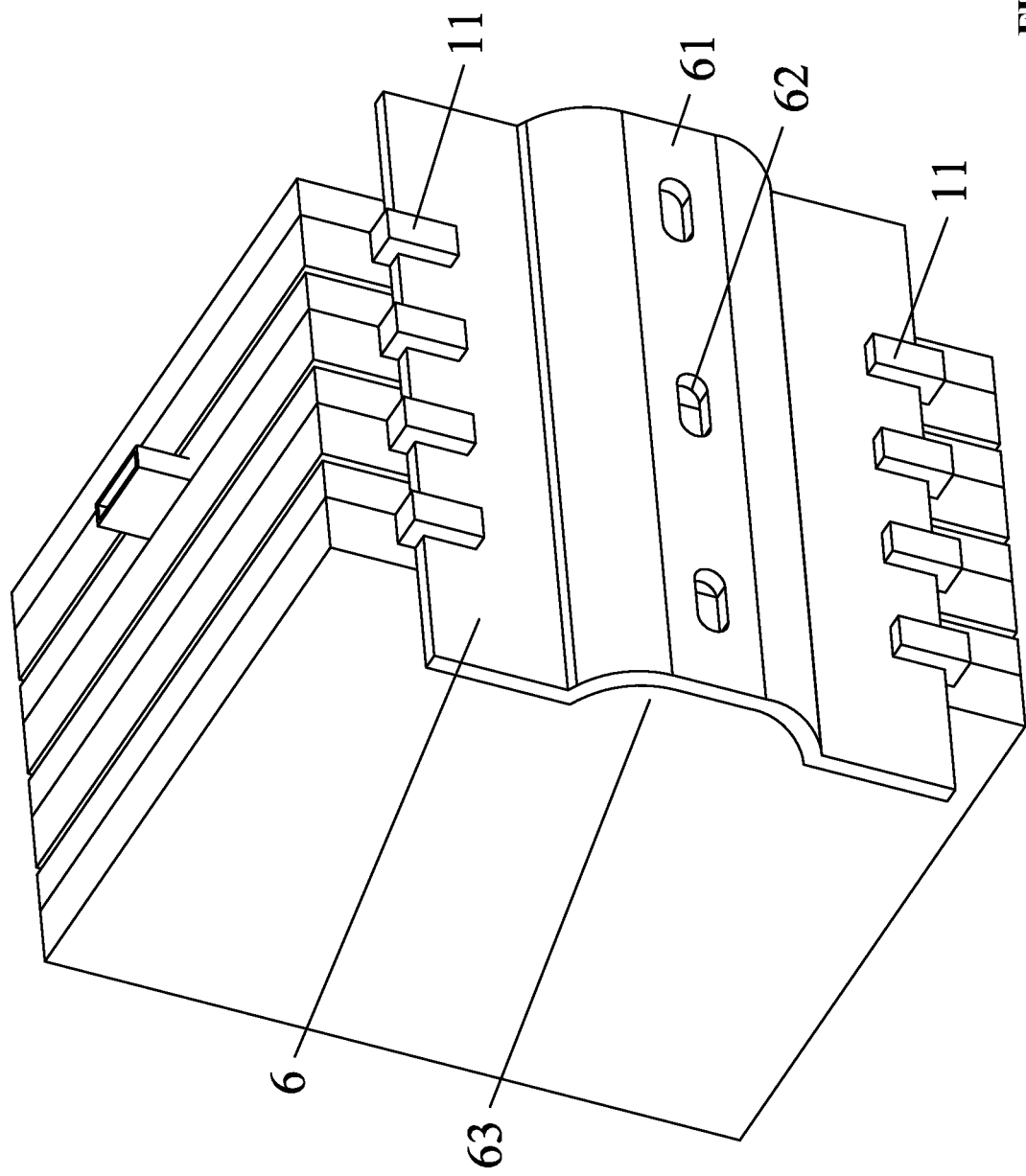
FIG. 10 is a perspective view of the combined motor controller from another angle after assembly according to Example 1 of the disclosure.
Figure 11:
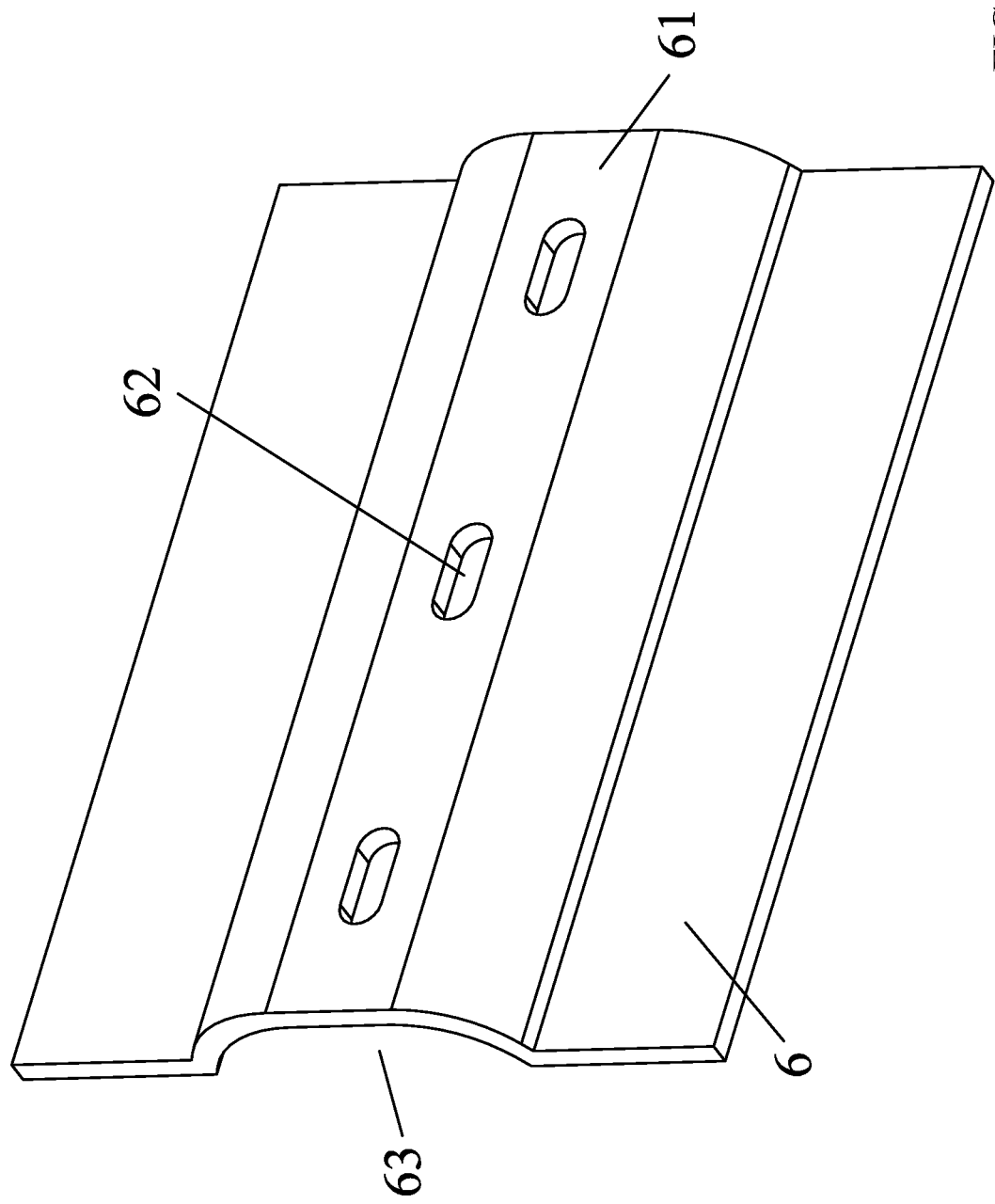
FIG. 11 is a perspective view of a din rail according to Example 1 of the disclosure.
Figure 12:
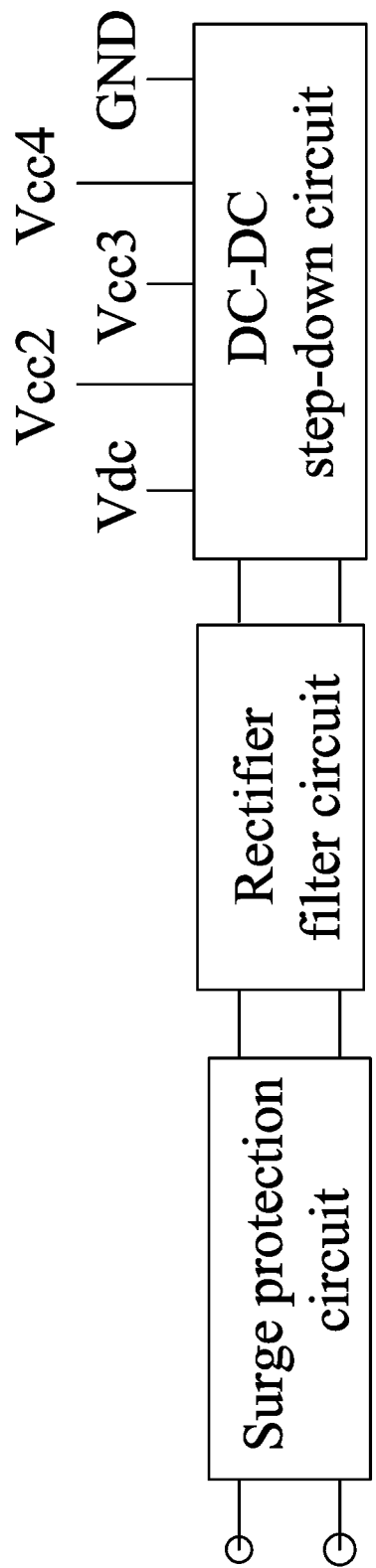
FIG. 12 is a circuit block diagram of a power module according to Example 1 of the disclosure.

As shown in FIGS. 6 to 11, each function module is provided with an independent metal or plastic shell 1 and a first circuit board 2 located inside the shell, and the first circuit board 2 protrudes from a socket 3 exposed outside the shell 1. All the function modules are connected by flexible flat cables 4 to realize power supply and signal transmission. Each function module is provided with the independent metal or plastic shell 1 which can effectively protect the parts, so as to avoid the risk caused by the contact between the function modules, effectively resist electromagnetic interference and ensure the reliable operation of the product. In FIG. 10, the motor controller is formed by combining a power module (Part No. A10), a motor control module (Part No. B10) and two I/O modules (the multi-position 24 VAC input module C10 and the pulse output module C16). Two fixture blocks 11 between which a neck is formed are provided on a back side of the shell 1, and the plurality of function modules are combined side by side by running a din rail 6 through the neck between the two fixture blocks 11. A central portion of the din rail 6 protrudes to form a boss 61 on which several mounting holes 62 are spaced, and the din rail 6 can be locked to a carrier by running screws through the mounting holes 62, with screw heads of the screws (not shown) sinking into a recess 63 on one side of the boss 61. Each function module is a rectangular shell of uniform height and depth and different width. All the function modules are lined up leaving no gap between two adjacent modules and then installed on a din rail, so that the modules are installed easily and flexibly and can be quickly produced and assembled. In FIG. 7, only two sockets 3 are shown in the first circuit board 2, but there are usually more than three sockets 3 for the motor control module having more external connections, which will not be described herein, and the number of sockets 3 depends on the requirements of the function modules. In FIG. 9, the combined motor controller is formed by the power module 7, the motor control module 8, the 5-position 24 VAC input module 9 (one I/O module) and the pulse output module 10 (another I/O module) from left to right.

According to the disclosure, the function modules may be connected to each other by mutually matched connectors, i.e., the function modules can be flexibly arranged in different positions and connected by flexible flat cables. According to the disclosure, the function modules may also be connected to each other by mutually matched connectors, i.e., the function modules get close together by plugging male connectors into female connectors to save space.

The combined motor controller of the disclosure is applicable to both indoor unit motors and outdoor unit motors. The function module with the same part number can be used in both indoor and outdoor unit bodies provided that appropriate voltage and power are provided. The function modules are described below by taking into account both the OEM's needs for mass production and the after-sales market.

The first function module is the power module comprising a surge protection circuit, a rectifier filter circuit and a DC-DC step-down circuit, and is powered by the mains supply to output a corresponding DC power supply. The design idea of the patent application is to provide power modules with different part numbers depending on voltage and motor power, for example:

Part No. A101: 120/230/277 VAC/60 Hz/1 Ph suitable for ¼ HP motors or below;
Part No. A102: 120/230/277 VAC/60 Hz/1 Ph suitable for ⅓ HP and ½ HP motors;
Part No. A101: 120/230/277 VAC/60 Hz/1 Ph suitable for ¾ HP and 1 HP motors;
Part No. A104: 460 VAC/60 Hz/3 Ph suitable for 1.2 HP to 2 HP motors;
Part No. A105: 460 VAC/60 Hz/3 Ph suitable for 2.3 HP to 3.5 HP motors;
Part No. A105: 460 VAC/60 Hz/3 Ph suitable for 5 HP motors;
. . .
Part No. A10N: 575 VAC/60 Hz/3 Ph suitable for 5 HP motors;

The power modules in other voltage ranges and power ranges will not be described one by one. In short, the power supply modules have a plurality of part numbers in order to cope with different voltages and powers. Once all of these part numbers are identified, customers can flexibly choose the power modules to match with different motors, and one 1HP power module can power two ½ HP motor bodies simultaneously.

The second function module is the motor control module comprising the MCU, the IGBT inverter (an inverter circuit) and the radiator. One motor control module controls one motor body, and the motor control module powered by the VDC power supply is configured to receive control signals and output a three-phase (or multi-phase) UVW power supply to the motor body, so as to control speed or torque or air flow of the motor body. If a Hall element is required to detect a rotor position signal, the motor control module further needs to be provided with a Hall signal input port.

The motor control module is further provided with a port for driver updates to ensure compatibility with different I/O modules, to fix the bugs of the driver, and to add functions in the future, as well as a port for PC connection to configure various parameters of the motor by programming. Similarly, the motor control module may also have part numbers as follows:

Part No. B101: suitable for ¼ HP DM2 motor bodies or below
Part No. B102: suitable for ¼ HP DM3 motor bodies or below
Part No. B103: suitable for ⅓ HP and ½ HP DM2 motor bodies
Part No. B104: suitable for ⅓ HP and ½ HP DM3 motor bodies
. . .
Part No. B120: suitable for 5 HP DM2 motor bodies
Part No. B131: suitable for 5 HP DM3 motor bodies The multi-position 24 VAC input module in the third function module can be disassembled into a plurality of module parts depending on the number of positions and the voltage at each position. Of course, the motor control module needs to be supported by a corresponding driver in any case.

The serial communication module based on RS485 requires the motor control module to be provided with corresponding drivers to be compatible with different communication protocols such as Modbus and ClimateTalk.

A dedicated communication module and a communication module of the system control unit at the client may be provided in the I/O module.

Users can flexibly choose the above function modules according to their own needs. A few examples are given below.

Example 1: User A needs to control one 3 HP indoor unit motor and two ⅓ HP outdoor unit motors of a commercial air conditioner at the same time, and each motor is controlled by 5-position control signals. A solution is as follows.

One power module with a specific part number may be selected enough (two or three smaller power modules may also be selected) to power the three motors.

In case of one 3 HP motor control module, a corresponding motor control module with a specific part number is selected.

In case of two ⅓ HP motor control modules, two corresponding motor control modules with specific part numbers are selected.

In case of three 5-position input modules, corresponding multi-position input modules with specific part numbers are selected.

The motor controller can be produced by selecting and assembling different modules, and no R&D and design is required in the early stage, which makes the production cycle short, saves R&D expenses and facilitates after-sales maintenance.

Example 2: User B needs to control a ½ HP indoor unit motor and a ¼ HP outdoor unit motor of a household air conditioner at the same time. The indoor unit motor requires a 0-10 VDC 10-position controller while the outdoor unit motor requires a 3-position controller. The indoor motor needs to output a pulse signal to the system main control board to realize the function of adjusting the motor speed in real time. A solution is as follows.

One power module which is enough to power to two motors
One ½ HP motor control module
One ¼ HP motor control module
Two 5-position input modules
One 0-10 VDC input module
One pulse output module The above examples show that the previous integrated controller is disassembled into various function modules, so that users can flexibly choose different modules according to their own needs, which reduces the cost of OEMs and users compared with the previous "large and complete" design. In addition, if a module fails, it is simply needed to replace the module, saving costs for the after-sales market as well. Moreover, these function modules may be installed on one base or in different positions, again providing customers with ease of installation.

Embodiment 2

Figure 16:
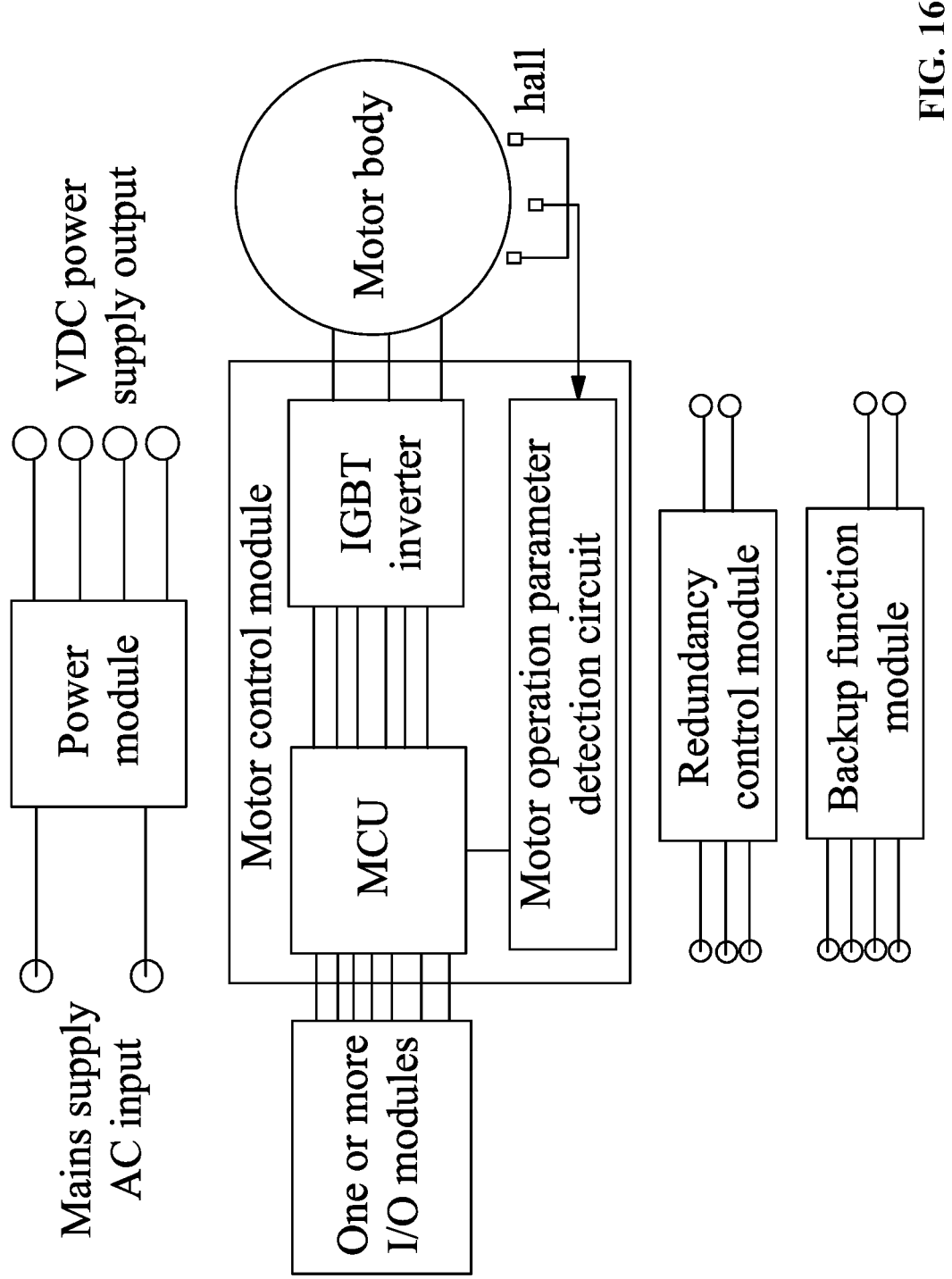
FIG. 16 are circuit block diagrams according to an embodiment 2 of the disclosure.
Figure 17:
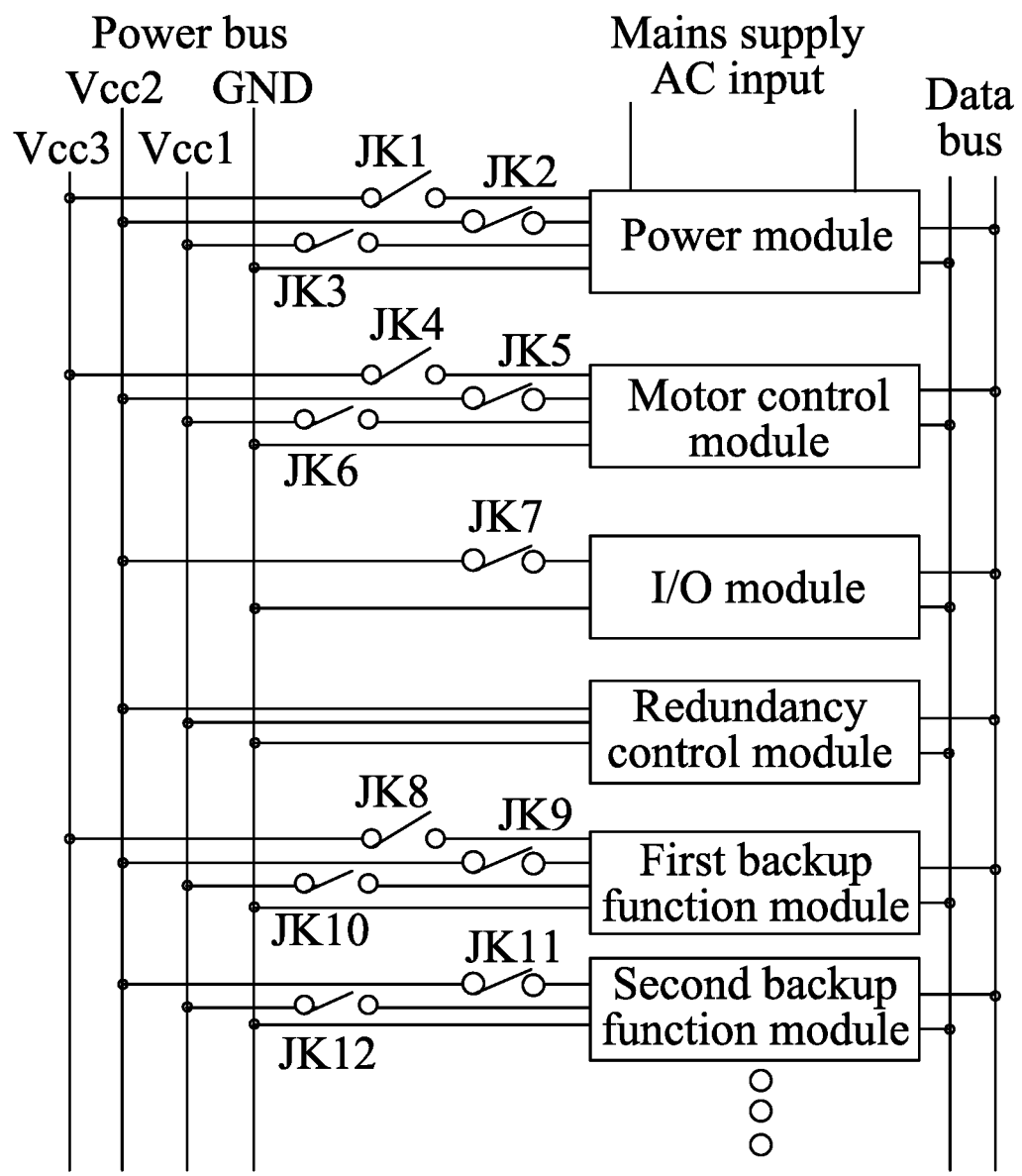
FIG. 17 is a connection schematic diagram of all function modules according to Example 2 of the disclosure.

As shown in FIGS. 16 and 7, the following modules are additionally provided in the embodiment based on Embodiment 1.

A fourth function module is a redundancy control module configured to automatically activate a backup function module when the first function module, the second function module or the third function module fails, so as to ensure that a client system (e.g., an entire air conditioning system) can still operate smoothly.

A fifth function module is the backup function module having the same function as the first function module, the second function module or the third function module, wherein one or more backup function modules are provided to meet the customer needs.

Figure 18:
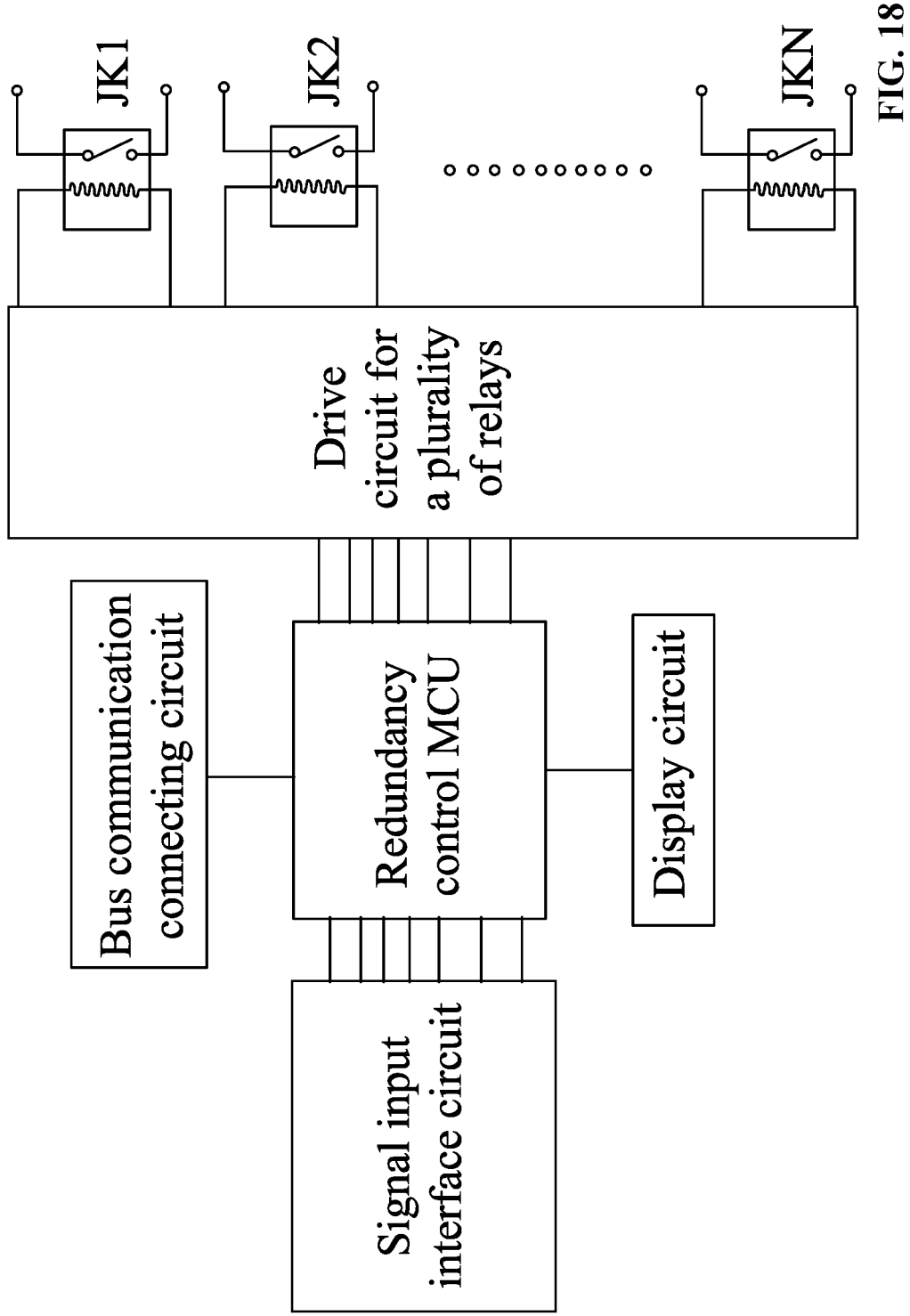
FIG. 18 is a circuit block diagram of a redundancy control module according to Example 2 of the disclosure.
Figure 19:
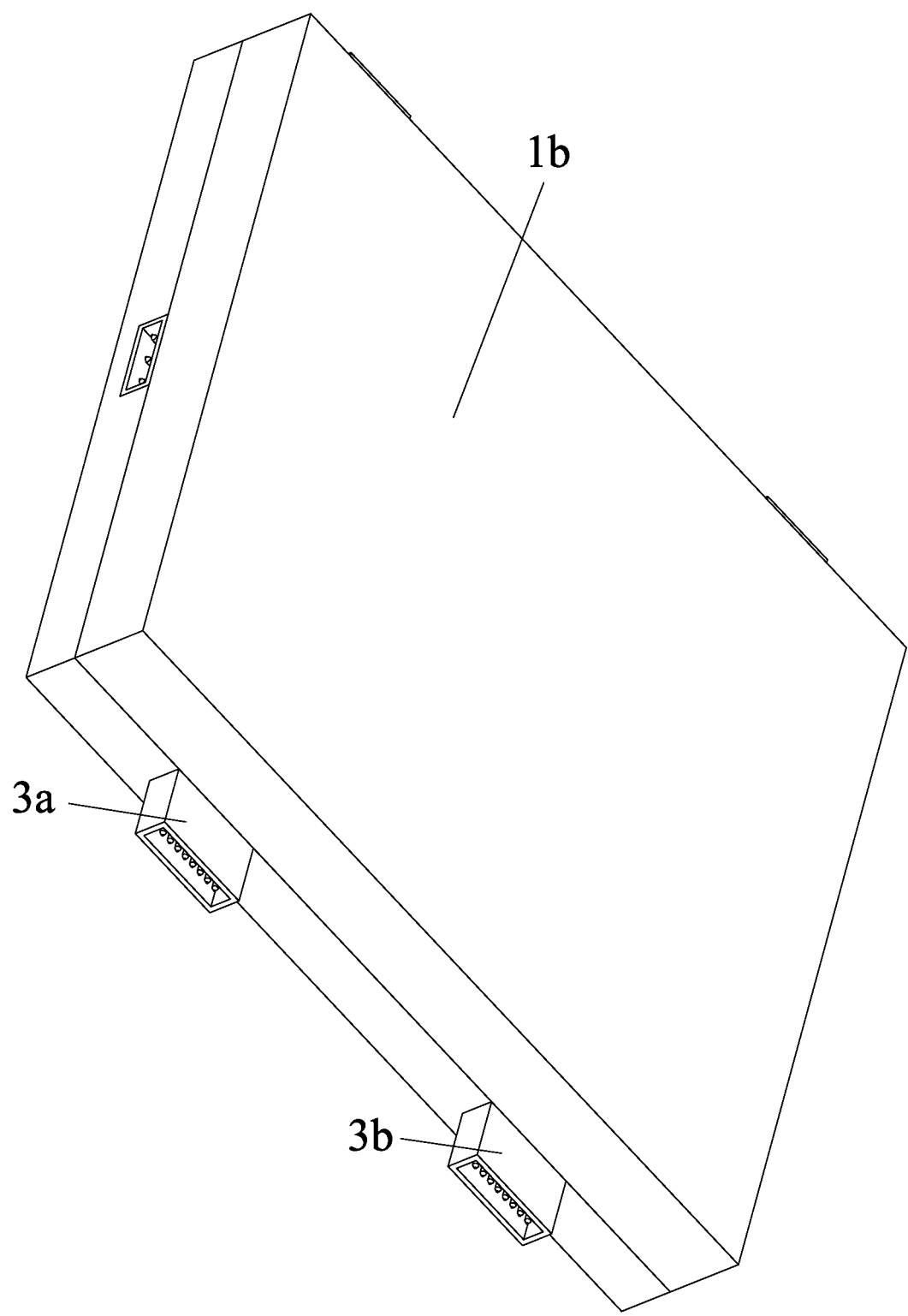
FIG. 19 is an external perspective view of the function module according to Example 2 of the disclosure.
Figure 20:
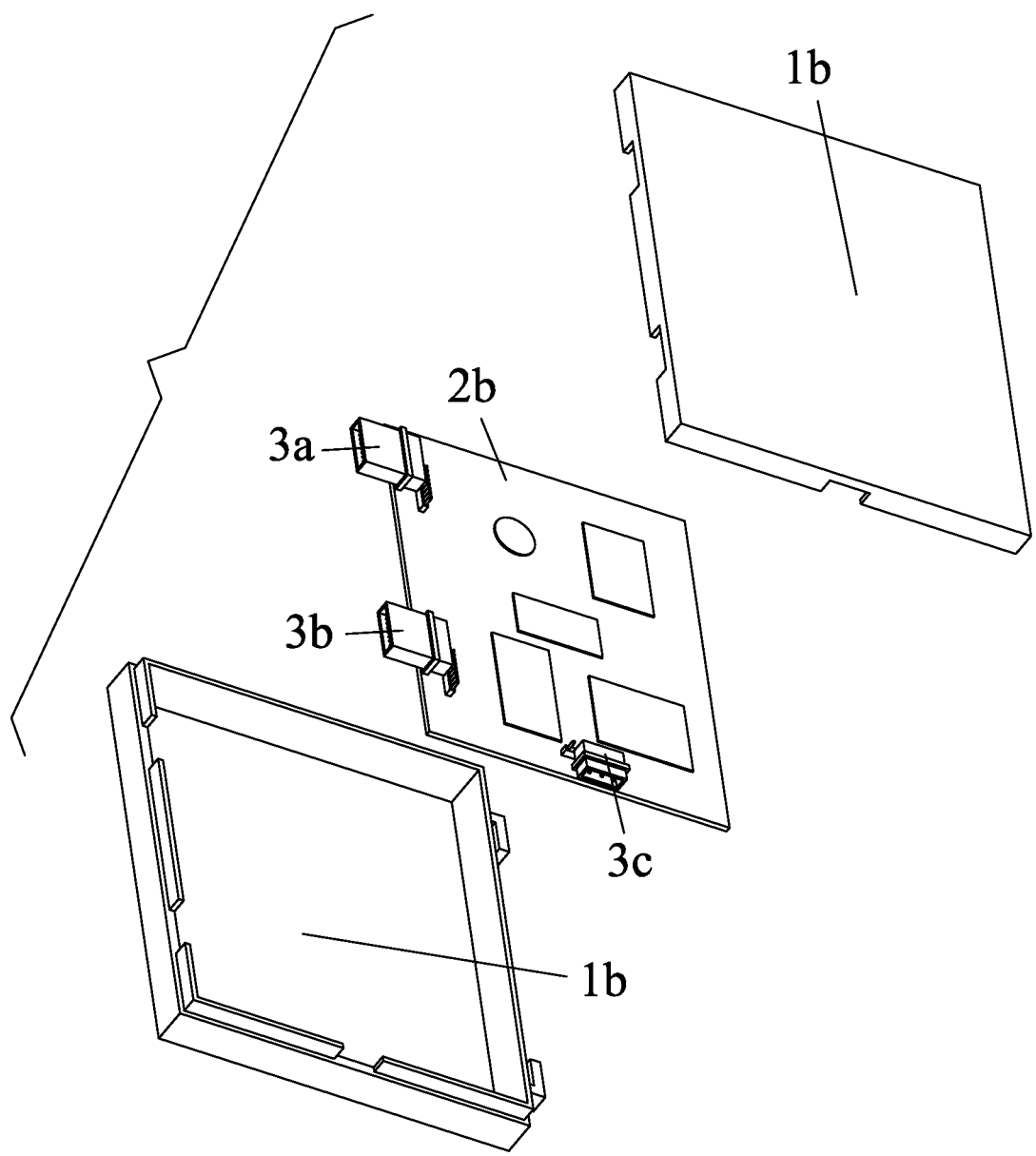
FIG. 20 is an exploded view of the function module according to Example 2 of the disclosure.
Figure 21:
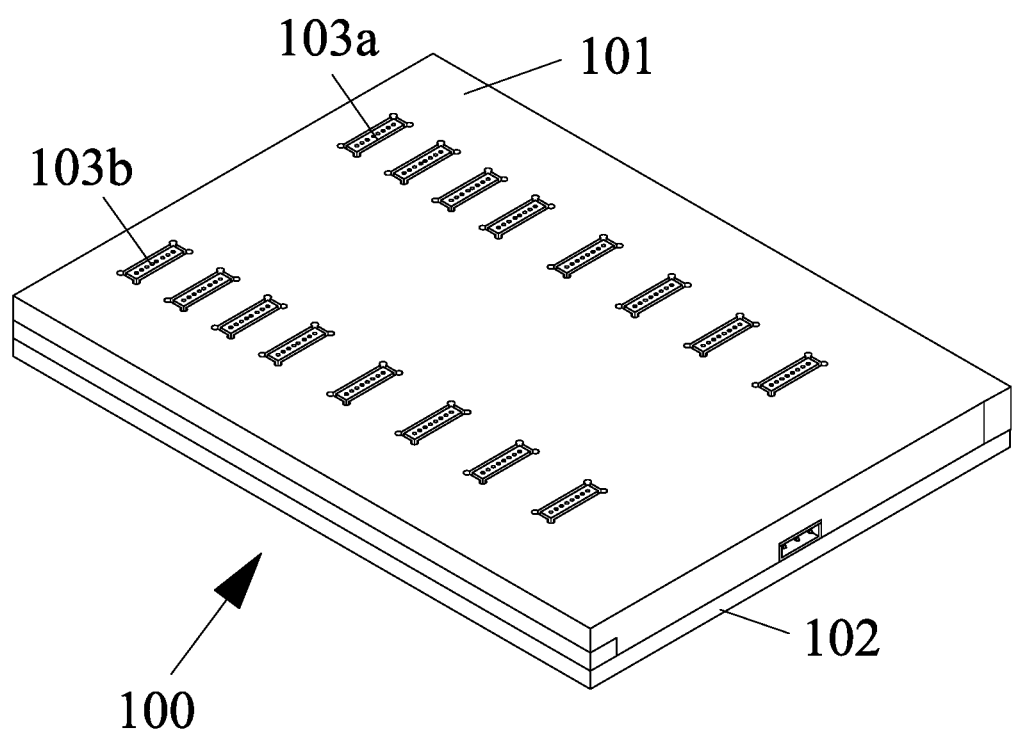
FIG. 21 is a perspective view of a base according to Example 2 of the disclosure.
Figure 22:
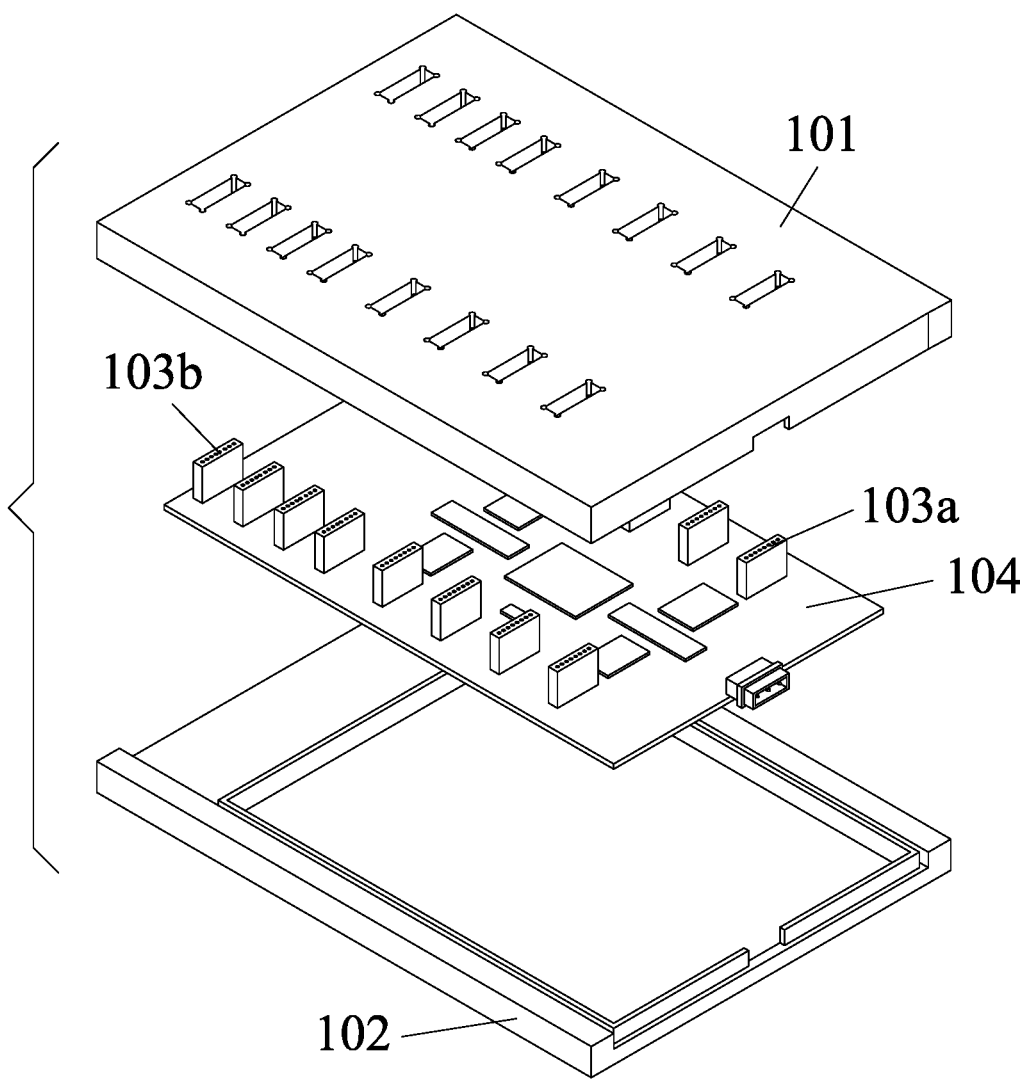
FIG. 22 is an exploded view of the base according to Example 2 of the disclosure.

As shown in FIG. 18, the redundancy control module comprises a redundancy control MCU, a plurality of relays, a display circuit and a bus communication connecting circuit, and the redundancy control MCU of the circuit is communicated with other function modules by the bus communication connecting circuit. The redundancy control MCU automatically activates the backup function module by the plurality of the relays, i.e., in case a certain function module fails in operation, the relays are turned on to realize disconnection of the failed function module and connection of a replaced backup function module. The display circuit is configured to display the status of other function modules. For example, the display circuit adopts simple LED lights, a plurality of 8-segment LED screens, high-end color screens and so forth to show which function module is in operation and which function module's redundancy control is enabled (that is to say, when the main module of that function module fails and the backup module is activated, the maintenance and replacement shall be made as soon as possible). The redundancy control MCU is further connected to a signal input interface circuit for receiving external input signals. Therefore, the signal input interface circuit may serve as a 5-position 24 VAC input signal interface. Additional 5-position 24 VAC input signal interface circuits, or PWM input signal interface circuits, 0-10 VDC input signal interface circuits and serial communication interface circuits may be provided if required, and these backup functions may be integrated in the redundancy control module. In FIG. 7, there are N relays, which are JK1, Jk2 . . . JKN configured to realize connection and activation of the power module, the motor control module, the I/O module and the backup function module. There are N relays in FIG. 7 corresponding to JK1, JK2, JK3, JK4, JK5, JK6, JK7, JK8, JK9, JK10, JK11 and JK12 in FIG. 6.

The production method of the combined modules is flexible, convenient and strongly adaptable and can shorten the research and development cycle, so that the combined modules can be produced conveniently and efficiently, operate more reliably, and can be easily replaced in case a certain function module fails during after-sales maintenance, thus reducing the maintenance cost and realizing convenient and efficient maintenance.

As shown in FIGS. 19 to 25, all function modules (comprising the first function module, the second function module, the third function module, the fourth function module and the fifth function module) of the disclosure are fixed on a base 100 designed as a purely mechanical mounting base, and a power bus hub 103a and a data bus hub 103b are additionally provided on the purely mechanical mounting base for power supply or control signal transmission between the function modules.

In FIGS. 19 to 25, the function modules, such as the power module, motor control module, the I/O module, the redundancy control module and the backup function module, are provided with an independent metal or plastic shell 1b and a first circuit board 2b located inside the shell 1b, respectively. The first circuit board 2b is provided with a power socket 3a, a bus communication socket 3b and a plurality of signal sockets 3c (only one is shown). However, a plurality of signal sockets 3c can be provided according to the requirements of the function modules. For example, a plurality of signal sockets 3c are required in the connection between the motor control module and a plurality of I/O modules, and a power socket is also required in the connection between an output end of the motor control module and the motor body.

The power socket 3a and the bus communication socket 3b protrude a distance from the shell 1b, so that the power socket 3a and the bus communication socket 3b are plugged into and connected to the power bus hub 103a and the data bus hub 103b on the base 100, respectively.

The base 100 comprises an upper casing 101, a lower casing 102, and a second circuit board 104 installed in a cavity enclosed by the upper casing 101 and the lower casing 102. The second circuit board 104 is provided with a plurality of data buses and a power main circuit, and protrudes from the power bus hub 103a and the data bus hub 103b. The base 100 is provided with multiple rows of the power bus hubs 103a and the data bus hub 103b, with one power bus hub 103a and one data bus hub 103b in each row.

An input end of the power module 7 is externally powered by a mains supply AC input, and an output end thereof is matched with the power bus hubs 103a on the base 100 to power several power buses with a DC power supply. In the figures, there is a Vcc1 LVDC bus voltage (e.g., 325 VDC) to power the motor body, there is a Vcc2 LVDC bus voltage (e.g., +15 V DC) to power the IGBT inverter, and there is a Vcc3 LVDC bus voltage (e.g., +5 V DC) to power the motor control MCU; GND in the figures stands for ground. A data bus and a power bus in FIG. 6 are arranged in the second circuit board inside the base 100, and a bus communication function circuit is further provided in the second circuit board.

Figure 26:
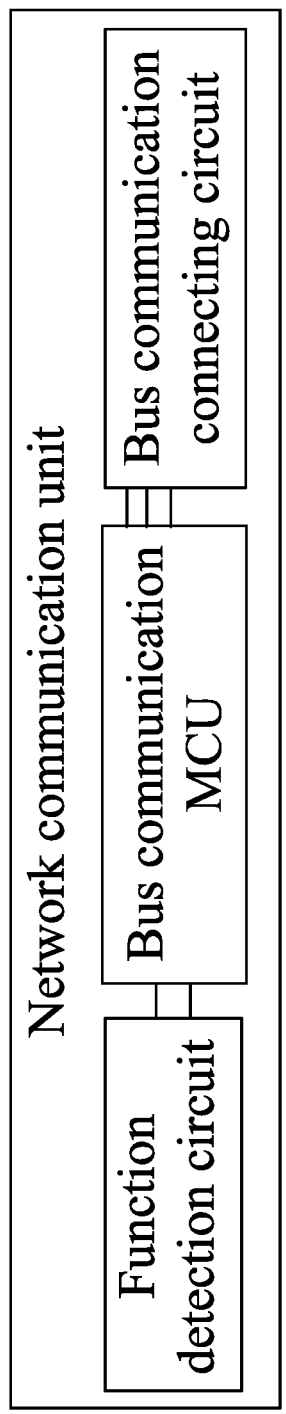
FIG. 26 is a block diagram of a network communication unit according to Example 2 of the disclosure.

As shown in FIG. 26, the first function module, the third function module and the backup function module are all further provided with a network communication unit comprising a bus communication MCU, a communication bus connecting circuit and a function detection circuit. The function detection circuit is configured to detect the status of its respective module and transmit signals to the bus communication MCU, and the bus communication MCU is connected to a data bus by the communication bus connecting circuit for data transmission with the redundancy control MCU. The motor control module may be additionally provided with a communication bus connecting circuit to connect the motor control MCU to the data bus for data transmission with other function modules.

Figure 23:
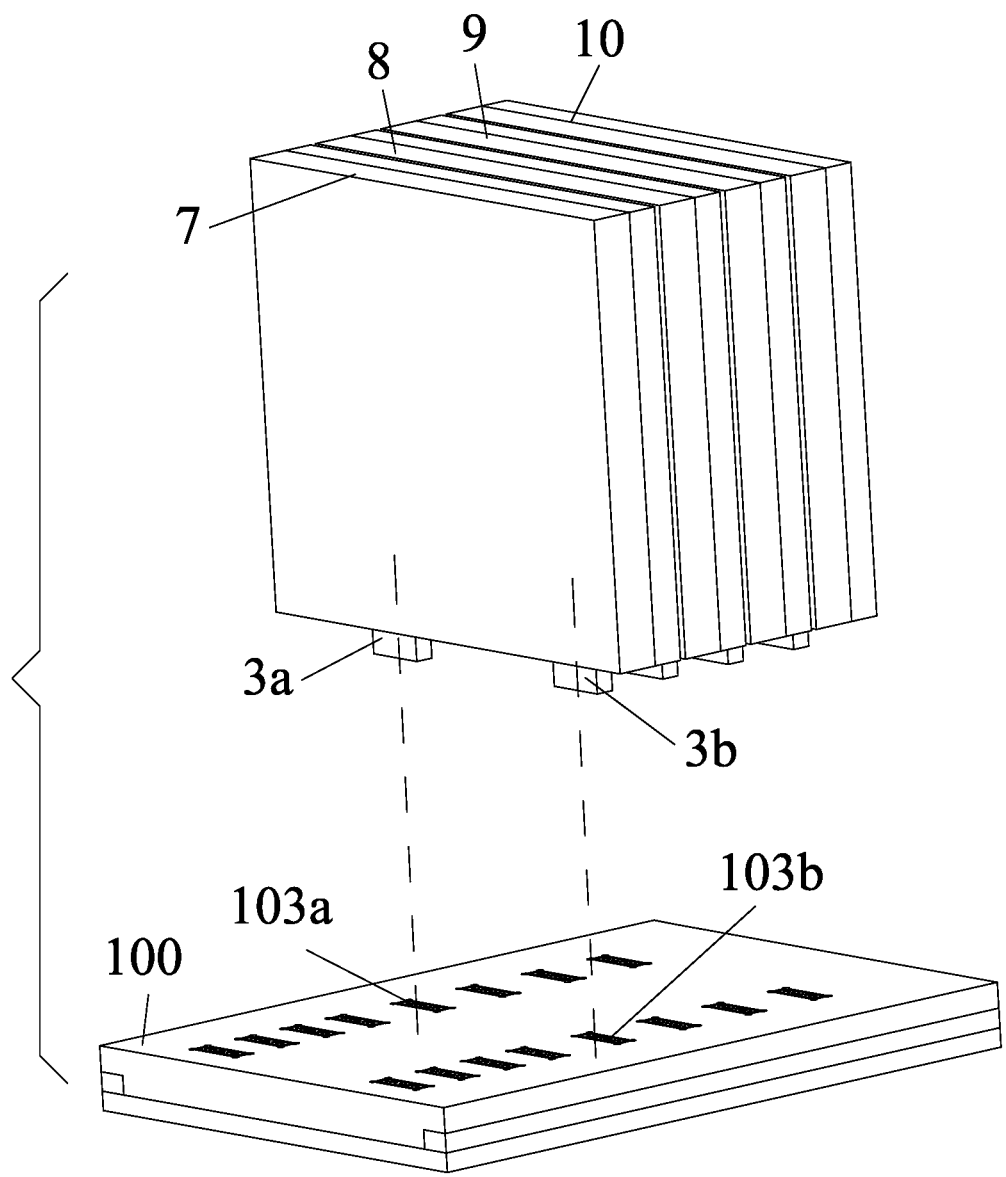
FIG. 23 is an exploded view of a motor control unit according to Example 2 of the disclosure.
Figure 24:
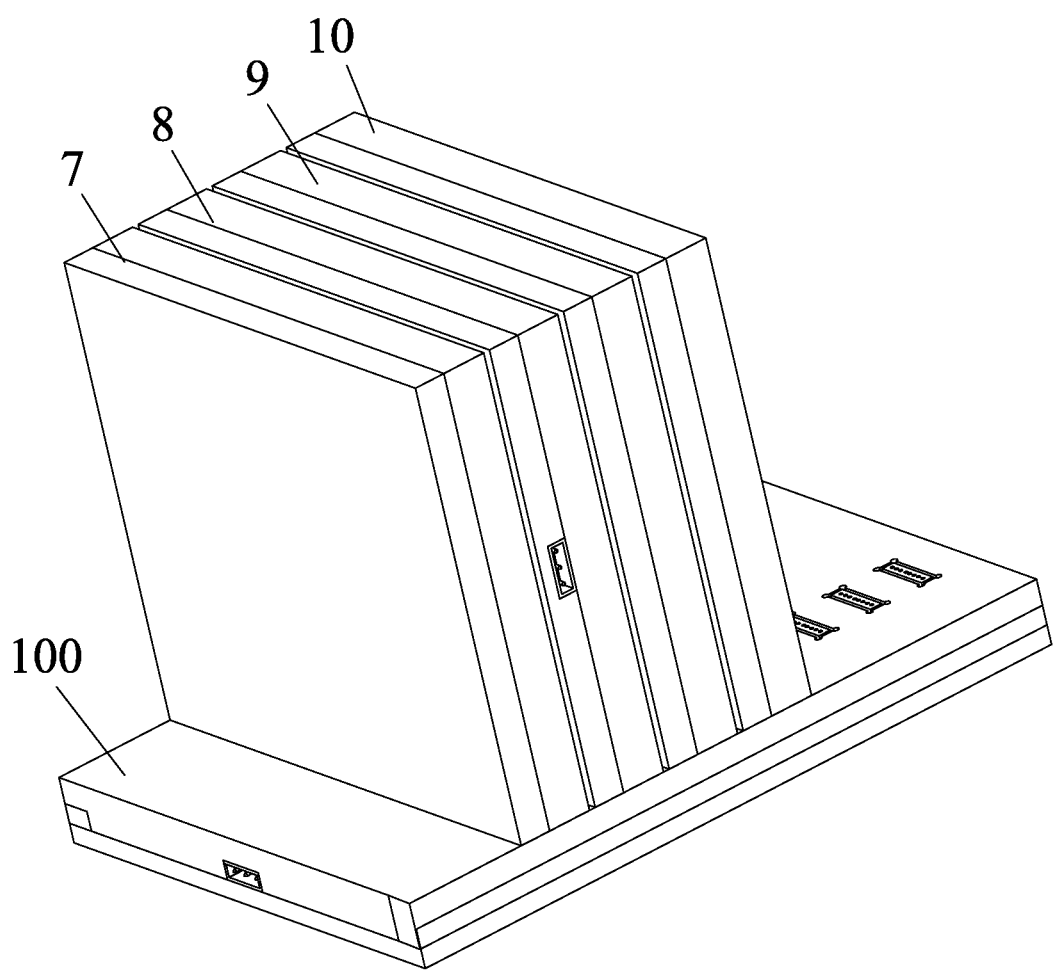
FIG. 24 is a perspective view of the motor control unit after assembly according to Example 2 of the disclosure.

As shown in FIGS. 23 and 24, the combined motor unit is formed by the power module 7, the motor control module 8, the Bluetooth wireless communication module 9 (one I/O module) and the PWM input module 10 (another I/O module) from left to right. Of course, other function modules, such as the Ethernet LAN module and the dip switch module, may be additionally provided according to customer needs, which will not be described in detail herein.

Figure 25:
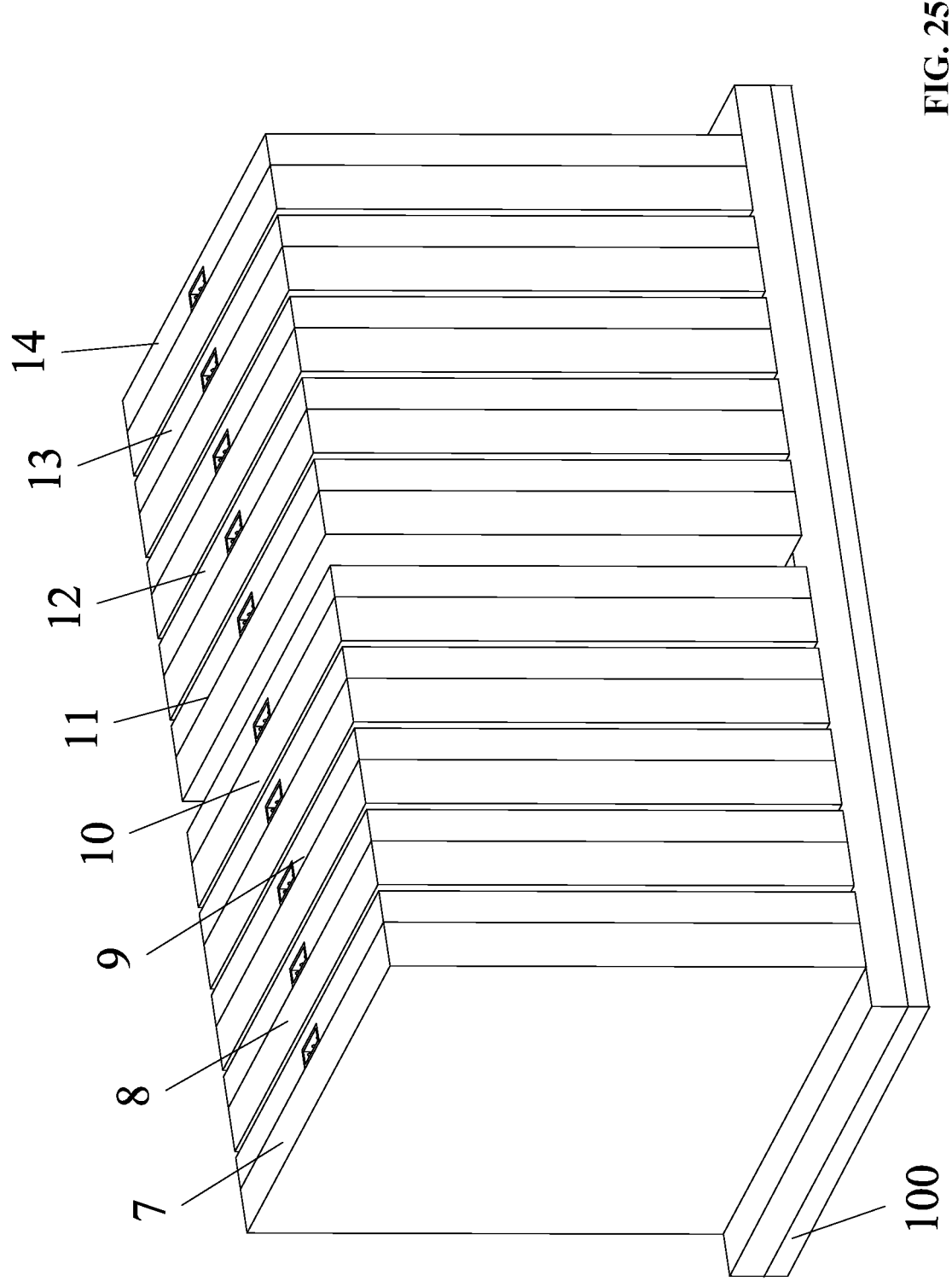
FIG. 25 is a perspective view of the motor control unit additionally provided with a redundancy control module according to Example 2 of the disclosure.

As shown in FIG. 25, the redundancy control module and a plurality of backup function modules are additionally provided in the motor control units shown in FIGS. 23 and 24 to ensure that the client system (e.g., an entire air conditioning system) can still operate smoothly. The power module 7, the motor control module 8, the Bluetooth wireless communication module 9 (one I/O module), the PWM input module 10 (another I/O module), the redundancy control module 11, the first backup function module 12 (a backup power module), the second backup function module 13 (a backup motor control module) and the third backup function module 14 (a backup Bluetooth wireless communication module) are arranged from left to right. For example, the Bluetooth wireless communication module 9, once failed, can be replaced by the third backup function module 14 (the backup Bluetooth wireless communication module) activated under the control of the redundancy control module 11. For another example, once the motor control module 8 fails, the second backup function module 13 (the backup motor control module) can be activated immediately under the control of the redundancy control module 11 to ensure the normal and reliable operation of the client system. The display circuit of the redundancy control module 11 is configured to show which function module is in operation and which function module's redundancy control is enabled, that is to say, when the main module of that function module fails and the backup module is activated, the maintenance and replacement shall be made as soon as possible.

When the network communication unit is not available, the redundancy control module continuously sends query instructions to the motor control module to check whether the DC bus voltage, speed, torque, air flow and other parameters of the motor are within a reasonable range.

Figure 27:
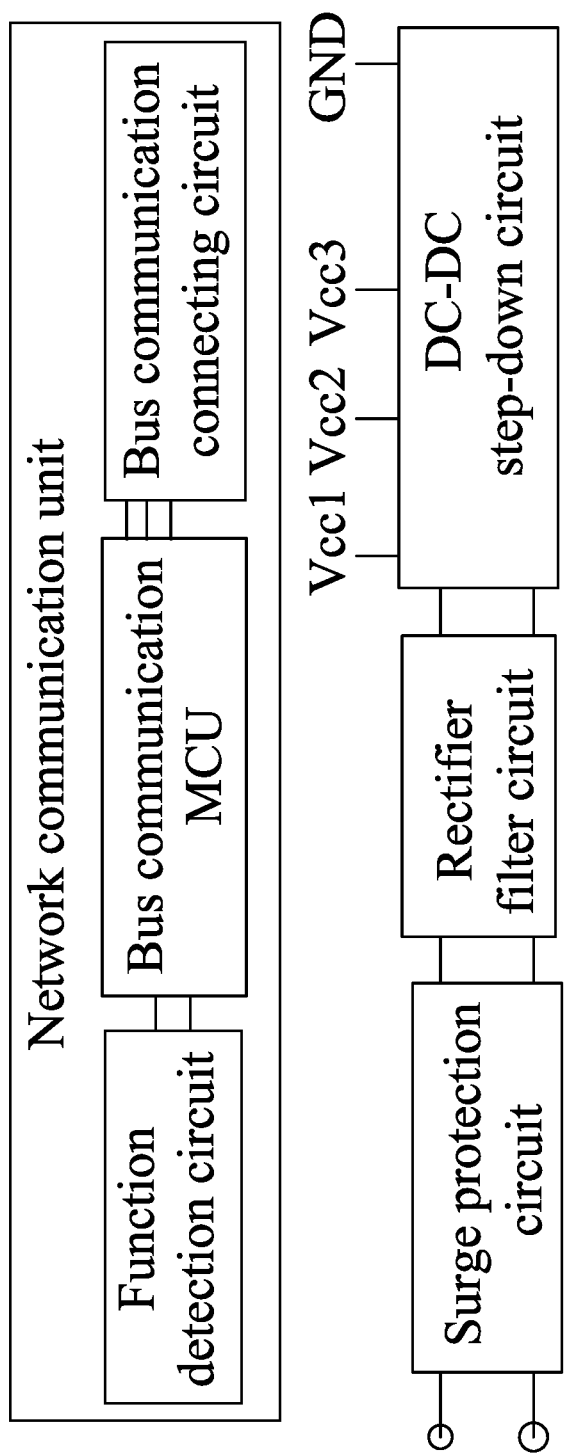
FIG. 27 is a circuit block diagram of a power module according to Example 2 of the disclosure.

FIG. 27 shows circuit block diagrams of the power module of the disclosure, comprising a surge protection circuit, a rectifier filter circuit, a DC-DC step-down circuit and a network communication unit. The network communication unit comprises a bus communication MCU, a communication bus connecting circuit and a function detection circuit. The function detection circuit is configured to detect the status of its respective module and transmit signals to the bus communication MCU, and the bus communication MCU is connected to a data bus by the communication bus connecting circuit for data transmission with the redundancy control MCU. The power module leads out DC voltage: Vcc1 (e.g., 325 VDC), Vcc2 (e.g., 15 VDC), Vcc3 (e.g., 5 VDC) and ground GND, where Vcc1 is the DC bus voltage that powers the motor body, Vcc2 is 15 VDC that powers the IGBT inverter, and Vcc3 is 5 VDC that powers the motor control MCU. The function detection circuit is only configured to detect whether the output voltage of the power supply is normal, so a common voltage detection circuit may be adopted.

Figure 28:
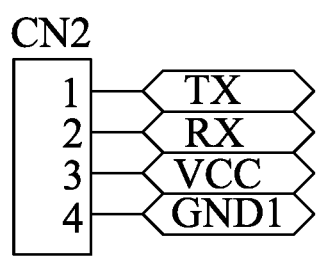
FIG. 28 is a block diagram of a serial communication module based on RS485 according to Example 2 of the disclosure.
Figure 28:
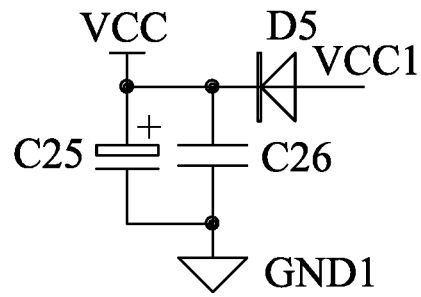
Figure 28:
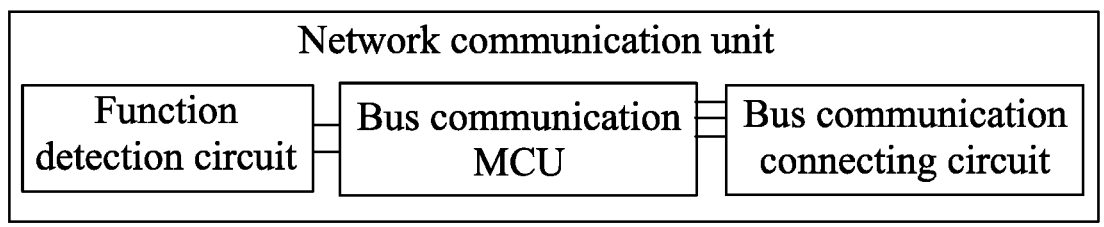
Figure 28:
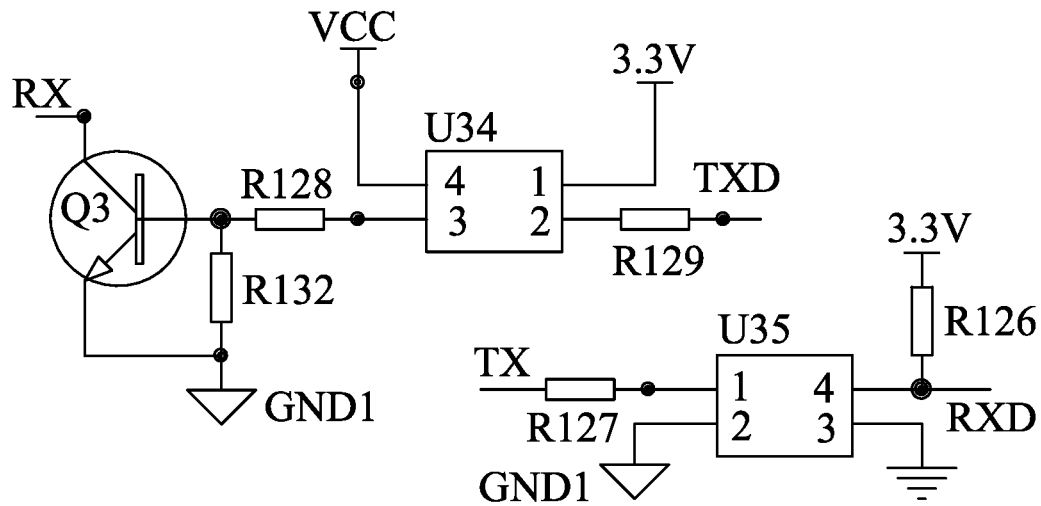

FIG. 28 shows circuit diagrams of the serial communication module based on RS485, in which an additional network communication unit is provided to detect the status of the serial communication module, and the serial communication module is connected to the data bus by the network communication unit for communication with the redundancy control module or the motor control module.

Figure 29:
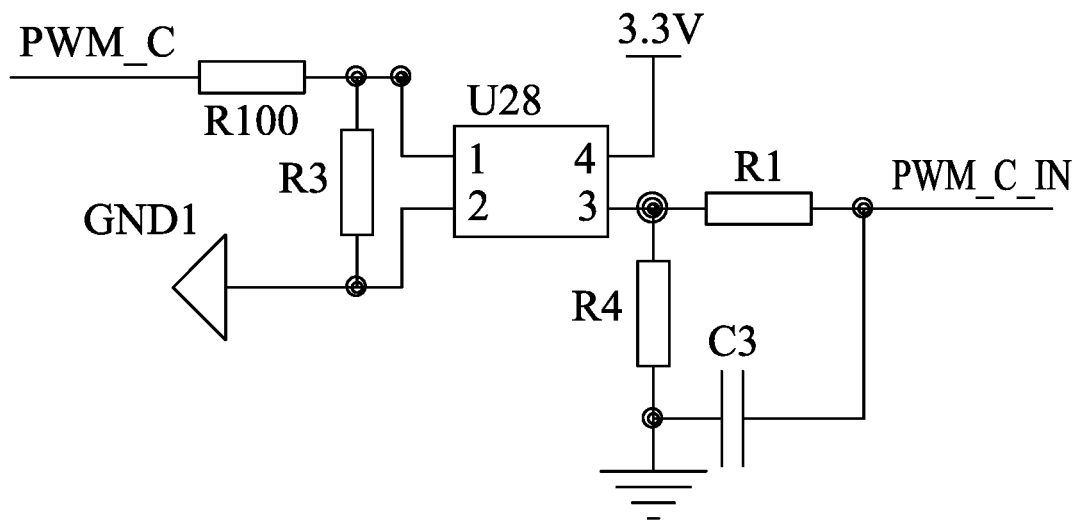
FIG. 29 is a block diagram of a PWM input module according to Example 2 of the disclosure.
Figure 29:
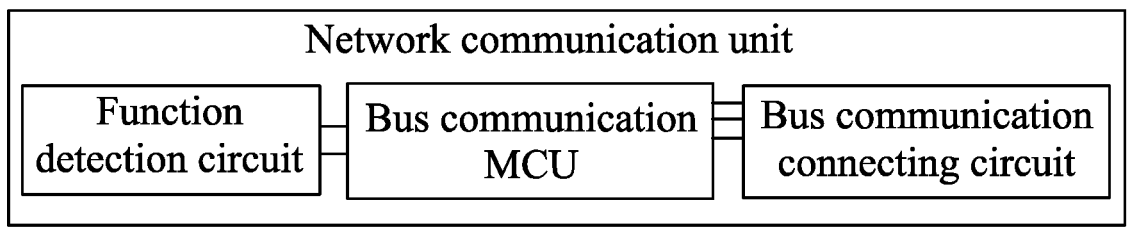
Figure 30A:
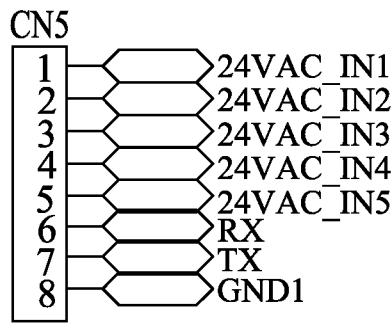
FIGS. 30A-30G are block diagrams of a 5-position 24 VAC input module according to Example 2 of the disclosure.
Figure 30B:
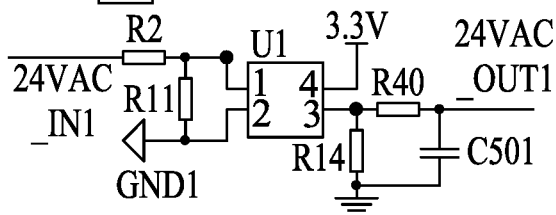
Figure 30C:
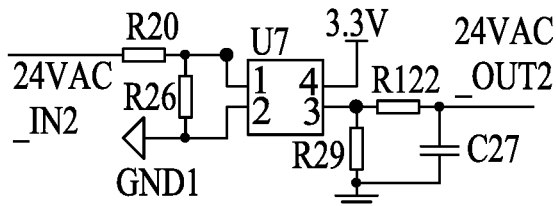
Figure 30D:
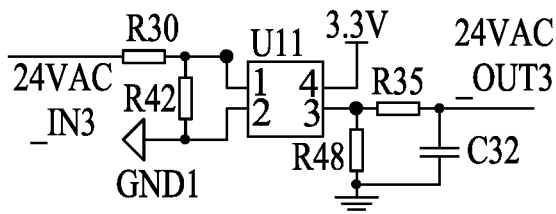
Figure 30E:
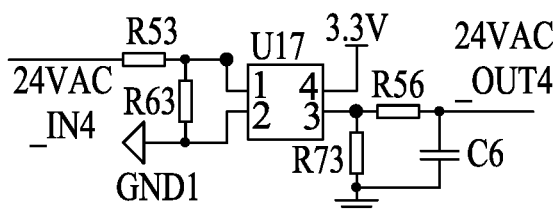
Figure 30F:
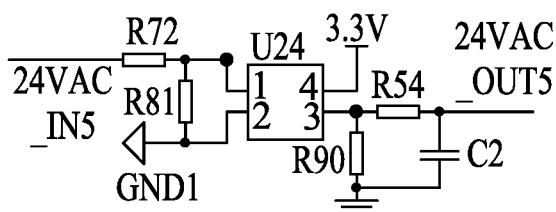
Figure 30G:
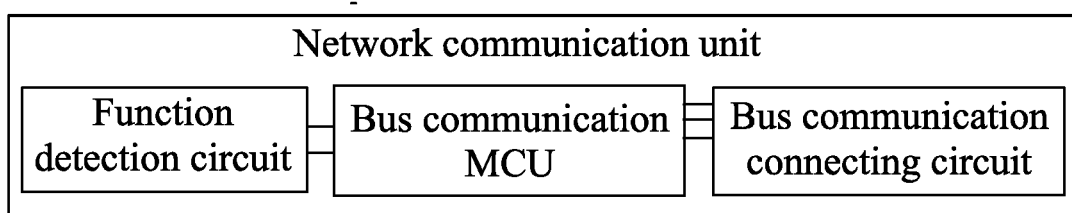

FIG. 29 shows circuit diagrams of the PWM input module, in which an additional network communication unit is provided to detect the status of the serial communication module, and the PWM input module is connected to the data bus by the network communication unit for communication with the redundancy control module or the motor control module.

FIGS. 30A-30G show circuit diagrams of the 5-position 24 VAC input module, in which an additional network communication unit is provided to detect the status of the serial communication module, and the 5-position 24 VAC input module is connected to the data bus by the network communication unit for communication with the redundancy control module or the motor control module.

For the redundancy control of a certain module, users need to install an additional module and a redundancy control module. Taking the redundancy control of the motor control module as an example, users need to install a redundancy control module and two motor control modules, of which one configured to control the motor body is normally called the main motor control module while the other is normally called the backup motor control module. The main motor control module and the backup motor control module are simultaneously connected to a DC bus of the power supply and a three-phase line of the motor body. Under normal circumstances, only the main motor control module operates, while the backup motor control module is disconnected by the redundancy control module through relays from the power supply and the three-phase line of the motor body.

The redundancy control module keeps communication with the main motor control module through the communication bus, and frequently checks the status of the main motor control module. If, at a certain moment, the redundancy control module detects that the main motor control module fails to return a status code based on the communication protocol, it can be determined after n consecutive iterations of detection that the main motor control module fails, so the relay of the main motor control module is turned off while the relay of the backup motor control module (i.e., the backup function module) is turned on, thus keeping the motor body in normal operation. Meanwhile, an interface of the display circuit of the redundancy control module reflects the switching of the modules in different ways, such as making different LED lights on, displaying different figures on the 8-segment LED screens, and displaying prompt text or patterns on the LED color screens.

Also, taking the redundancy control of the power supply as an example, users need to install a redundancy control module and two power modules, of which one is the main power module while the other is the backup power module (i.e., the backup function module). The two power modules are simultaneously connected to an external power supply (e.g., 460V 3-phase AC) and to the motor control module at downstream. Under normal circumstances, only the main power module is turned on by the relay controlled by the redundancy module, while the backup power supply is turned off by the relay of a redundancy controller.

The redundancy control module keeps communication with the main motor control module and frequently checks the status of the DC bus thereof (Note: it is assumed that the power module comes with the network communication unit). This is a way for the redundancy control module to determine which module is in normal operation and which module fails. Once the motor control module reports a power overrun on the DC bus, and such result is unchanged after n consecutive iterations of detection, the redundancy control module turns off the relay of the main power module, switches the main power module to the backup power module and displays the switching on the interface.

As for the logic of determining the status of and switching the multi-position input module, the PWM input module, the 0-10 VDC input module and the serial communication module, only the redundancy control of 5-position input module is described herein, and the redundancy control of other types of input signals is similar to the 5-position control logic, which will not be repeated herein. During connection, the user connects a 5-position 24 VAC thermostat signal to the 5-position main input module, as well as to the 5-position backup input module and the redundancy control module. The redundancy control module detects the parameters such as the speed/torque/air flow of the motor when monitoring that a 24 VAC position signal is received. When it is detected that a 24 VAC position signal exists and the motor should start up but does not, and such result is unchanged after n consecutive iterations of detection, the 5-position main input module is turned off and the 5-position backup input module is turned on.

Users can freely choose to additionally install one or more of the backup power module, the backup motor control module and the I/O module, without installing all of the supported modules. Here again, the flexibility of the combined control module is demonstrated.

The combined motor control unit of the disclosure is applicable to both indoor unit motors and outdoor unit motors. The function module with the same part number can be used in both indoor and outdoor unit motor bodies provided that appropriate voltage and power are provided. The function modules are described below by taking into account both the OEM's needs for mass production and the after-sales market.

The first function module is the power module comprising the surge protection circuit, the rectifier filter circuit and the DC-DC step-down circuit, and is powered by the mains supply to output a corresponding DC power supply. The power modules with different part numbers are provided depending on voltage and motor power, for example:

Part No. A101: 120/230/277 VAC/60 Hz/1 Ph suitable for ¼ HP motors or below;
Part No. A102: 120/230/277 VAC/60 Hz/1 Ph suitable for ⅓ HP and ½ HP motors;
Part No. A101: 120/230/277 VAC/60 Hz/1 Ph suitable for ¾ HP and 1 HP motors;
Part No. A104: 460 VAC/60 Hz/3 Ph suitable for 1.2 HP to 2 HP motors;
Part No. A105: 460 VAC/60 Hz/3 Ph suitable for 2.3 HP to 3.5 HP motors;
Part No. A105: 460 VAC/60 Hz/3 Ph suitable for 5 HP motors;
. . .
Part No. A10N: 575 VAC/60 Hz/3 Ph suitable for 5 HP motors;

Customers can flexibly choose the power modules with these part numbers to match with different motors, and one 1 HP power module can power two ½ HP motor bodies simultaneously.

The second function module is the motor control module comprising the MCU, the IGBT inverter (an inverter circuit), and the radiator. One motor control module controls one motor body, and the motor control module powered by the VDC power supply is configured to receive control signals and output a three-phase (or multi-phase) UVW power supply to the motor body, so as to control speed or torque or air flow of the motor body. If a Hall element is required to detect a rotor position signal, the motor control module further needs to be provided with a Hall signal input port.

The motor control module is further provided with a port for driver updates to ensure compatibility with different I/O modules, to fix the bugs of the driver, and to add functions in the future, as well as a port for PC connection to configure various parameters of the motor by programming. Similarly, the motor control module may also have part numbers as follows:

Part No. B101: suitable for ¼ HP DM2 motor bodies or below
Part No. B102: suitable for ¼ HP DM3 motor bodies or below
Part No. B103: suitable for ⅓ HP and ½ HP DM2 motor bodies
Part No. B104: suitable for ⅓ HP and ½ HP DM3 motor bodies
. . .
Part No. B120: suitable for 5 HP DM2 motor bodies
Part No. B131: suitable for 5 HP DM3 motor bodies The multi-position 24 VAC input module in the third function module can be disassembled into a plurality of module parts depending on the number of positions and the voltage at each position. Of course, the motor control module needs to be supported by a corresponding driver in any case.

For the serial communication module based on RS485, the motor control module should be provided with corresponding drivers to be compatible with different communication protocols such as Modbus and ClimateTalk.

A dedicated communication module and a communication module of the system control unit at the client may be provided in the I/O module.

The I/O module is subdivided into multiple types depending on functions, comprising following modules:
a multi-position 24 VAC input module (Part No. C101) receives a 24 VAC position signal from a main control board of a client and transmits the signal to the motor control module;
a PWM input module (Part No. C102) receives a PWM signal from the main control board of the client and transmits the signal to the motor control module;

a 0-10 VDC input module (Part No. C103) receives a 0-10 VDC signal from the main control board of the client and transmits the signal to the motor control module;

a serial communication module (Part No. C104) based on RS485 requires the motor control module to be provided with corresponding drivers to be compatible with different communication protocols;

a Bluetooth wireless communication module (Part No. C105) allows users to communicate wirelessly with the motor control module through a mobile App or a PC for configuration and diagnosis;

a pulse output module (Part No. C106) outputs pulses for the main control board of the client to monitor a certain parameter of the motor;

an Ethernet LAN module (Part No. C107) supports common TCP/IP protocols, and is configured to connect the motor control module to bring the motor control module under building network control or remotely control and monitor the parameter status of the motor through the Internet; the Ethernet LAN module is communicated with the MCU in the motor control module;

a Human Machine Interface (HMI) function module (Part No. C108) is provided with a basic monochrome HMI or an advanced high-definition color screen according to the market segmentation, allowing users to control the motor directly, to control the speed/torque/air flow of the motor in real time or to perform configuration and diagnosis, and HMI function module can even be used in laboratory tests; the HMI function module is communicated with the motor control module; and a dip switch module (Part No. C109) is connected to the motor control module by connectors, and several dip switches are provided in a row for users to change the parameters of the motor in real time; the dip switch module is communicated with the motor control module.

Users can flexibly choose the above function modules according to their own needs. A few examples are given below.

Example 1: User A needs to control one 3HP indoor unit motor and two ⅓ HP outdoor unit motors of a commercial air conditioner at the same time, and each motor is controlled by 5-position control signals. A solution is as follows.

One power module with a specific part number may be selected enough (two or three smaller power modules may also be selected) to power the three motors.

In case of one 3 HP motor control module, a corresponding motor control module with a specific part number is selected.

In case of two ⅓ HP motor control modules, two corresponding motor control modules with specific part numbers are selected.

In case of three 5-position input modules, corresponding multi-position input modules with specific part numbers are selected.

The motor controller can be produced by selecting and assembling different modules, and no R&D and design is required in the early stage, which makes the production cycle short, saves R&D expenses and facilitates after-sales maintenance.

Example 2: User B needs to control a ½ HP indoor unit motor and a ¼ HP outdoor unit motor of a household air conditioner at the same time. The indoor unit motor requires a 0-10 VDC 10-position controller while the outdoor unit motor requires a 3-position controller. The indoor motor needs to output a pulse signal to the system main control board to realize the function of adjusting the motor speed in real time. A solution is as follows.

One power module enough to power two motors
One ½ HP motor control module
One ¼ HP motor control module
Two 5-position input modules
One 0-10 VDC input module
One pulse output module Example 3: User C needs to control one 5 HP indoor unit motor and two ⅓ HP outdoor unit motors of a commercial air conditioner at the same time, has high requirements for the normal operation of the air conditioner and would rather spend more money to ensure the normal operation of the air conditioner. The analysis shows that local power grids are not high in quality, and there were cases of motor power supply and IGBT burning down in the past due to often thunderstorms. A solution is as follows.

One main power module which is enough to power three motors
One identical backup power module
One 5 HP main motor control module
One 5 HP backup motor control module
Two ⅓ HP main motor control modules
Two ⅓ HP backup motor control modules
Three 5-position input modules
One redundancy control module The above function modules are combined and installed on a base 100, and each function module performs power supply connection and data transmission through the data bus and the power bus on the second circuit board of the base 100, thereby forming an integral motor control unit.

The above examples show that the traditional motor controller is disassembled into various function modules, so that users can flexibly choose different modules according to their own needs, which reduces the cost of OEMs and users. In addition, if a module fails, it is simply needed to replace the module, saving costs for the after-sales market as well. Moreover, these function modules may be installed on one base or distributed in different positions, again providing customers with ease of installation.

Embodiment 3

A combination method of a motor controller is provided. Specifically, the motor controller is subdivided into a plurality of function modules as follows depending on functions.

A first function module is a power module connected to the mains supply to output a corresponding DC power supply to power other modules. There is a plurality of power modules of different sizes according to different voltage and motor power requirements.

A second function module is a motor control module comprising a microprocessor control unit (MCU) and an IGBT inverter. One motor control module controls one motor body, and the motor control module powered by the VDC power supply is configured to receive external input control signals and output power to the motor body, so as to control speed or torque or air flow of the motor body. There are a plurality of motor control modules of different sizes depending on motor power.

A third function module is an I/O module configured to transmit signals between a system main control board or a peripheral device and the motor control module. There may be at least one third function module or may be several types of third function modules combined according to communication requirements to realize signal transmission between the system main control board or the peripheral device and the motor control module.

The at least one power module, the at least one motor control module and the at least one I/O module matched with parameters for controlling motors are selected, combined, and connected together to form a combined motor controller.

The motor controller is subdivided into a plurality of function modules as follows depending on functions.

A fourth function module is a redundancy control module configured to automatically activate a backup function module when the first function module, the second function module or the third function module fails, so as to ensure that a client system can still operate smoothly.

A fifth function module is the backup function module having the same function as the first function module, the second function module or the third function module. One or more backup function modules are provided to meet the customer needs, and the above function modules are combined to form a motor control unit.

The first function module, the second function module, the third function module, the fourth function module and the fifth function module are all provided with an independent metal or plastic shell and a first circuit board located in the shell, and are connected by mutually matched connectors.

The I/O module is subdivided into multiple types depending on functions, and at least one of following I/O modules is selected for combinations according to requirements.

A multi-position 24 VAC input module receives a 24 VAC position signal from a main control board of a client and transmits the signal to the motor control module.

A PWM input module receives a PWM signal from the main control board of the client and transmits the signal to the motor control module.

A 0-10 VDC input module receives a 0-10 VDC signal from the main control board of the client and transmits the signal to the motor control module.

A serial communication module based on RS485 requires the motor control module to be provided with corresponding drivers to be compatible with different communication protocols.

A Bluetooth wireless communication module allows users to communicate wirelessly with the motor control module through a mobile App or a PC for configuration and diagnosis.

A pulse output module outputs pulses for the main control board of the client to monitor a certain parameter of the motor.

An Ethernet LAN module supports common TCP/IP protocols, and is configured to connect the motor control module to bring the motor control module under building network control or remotely control and monitor the parameter status of the motor through the Internet.

A Human Machine Interface (HMI) function module is provided with a basic monochrome HMI or an advanced high-definition color screen according to the market segmentation, allowing users to control the motor directly, to control the speed/torque/air flow of the motor in real time or to perform configuration and diagnosis, and the HMI function module can even be used in laboratory tests.

A dip switch module is connected to the motor control module by connectors, and several dip switches are provided in a row for users to change the parameters of the motor in real time.

The function modules are connected to each other by mutually matched connectors, i.e., the function modules can be flexibly arranged in different positions and connected by flexible flat cables. Each function module is a rectangular shell of uniform height and depth and different width. All the function modules are lined up leaving no gap between two adjacent modules and then installed on a din rail.

The function modules are connected to each other by mutually matched connectors, i.e., the function modules can be flexibly arranged in different positions and connected by flexible flat cables. All the function modules are fixed on a base designed as a purely mechanical mounting base.

All the function modules are fixed on a base designed as a purely mechanical mounting base, and a bus interface is additionally provided on the purely mechanical mounting base for power supply or control signal transmission between the function modules.

It will be obvious to those skilled in the art that changes and modifications may be made, and therefore, the aim in the appended claims is to cover all such changes and modifications.

What is claimed is:

1. A device, comprising:
   a first function module, comprising at least one power module powered by a mains supply to output a VDC power supply to power other modules;
   a second function module, comprising at least one motor control module comprising a microprocessor control unit (MCU) and an insulated gate bipolar transistor (IGBT) inverter; and
   a third function module, comprising at least one I/O module configured to transmit signals between a system main control board or a peripheral device and the motor control module;
   wherein:
   one motor control module controls one motor body, and the motor control module powered by the VDC power supply is configured to receive external input control signals and output power to the motor body, thereby controlling speed or torque or air flow of the motor body; and
   each function module is provided with an independent metal or plastic shell and a first circuit board located in the shell, and the first function module, the second function module and the third function module are connected by mutually matched connectors for power supply or control signal transmission between function modules.

2. The device of claim 1, further comprising:
   a fourth function module, comprising a redundancy control module configured to automatically enable a backup function module when the first function module, the second function module or the third function module fails, so as to ensure that a client system can still operate;
   a fifth function module, comprising the backup function module having the same function as the first function module, the second function module or the third function module, wherein one or more backup function modules are provided to meet customer needs, and the above function modules are combined to form a motor control unit; and
   the fourth function module and the fifth function module are both provided with an independent metal or plastic shell and a first circuit board located in the shell, and the first function module, the second function module, the third function module, the fourth function module, and the fifth function module are connected by mutually matched connectors.

3. The device of claim 2, wherein the redundancy control module comprises a redundancy control MCU, a plurality of relays, a display circuit, and a bus communication connecting circuit, and the redundancy control MCU of the circuit is communicated with other function modules by bus communication; the redundancy control MCU automatically enables the backup function module by the plurality of the relays; and the display circuit is configured to display the status of other function modules.

4. The device of claim 3, wherein the first function module, the third function module and the backup function module are all further provided with a network communication unit comprising a bus communication MCU, a communication bus connecting circuit, and a function detection circuit; the function detection circuit is configured to detect the status of its respective module and transmit signals to the bus communication MCU; and the bus communication MCU is connected to a data bus by the communication bus connecting circuit for data transmission with the redundancy control MCU.

5. The device of claim 4, wherein the I/O module is subdivided into multiple types depending on functions, comprising at least one of:
   a multi-position 24 VAC input module which receives a 24 VAC position signal from a main control board of a client and transmits the signal to the motor control module;
   a PWM input module which receives a PWM signal from the main control board of the client and transmits the signal to the motor control module;
   a 0-10 VDC input module which receives a 0-10 VDC signal from the main control board of the client and transmits the signal to the motor control module;
   a serial communication module based on RS485 which requires the motor control module to be provided with corresponding drivers to be compatible with different communication protocols;
   a Bluetooth wireless communication module which allows users to communicate wirelessly with the motor control module through a mobile App or a PC for configuration and diagnosis;
   a pulse output module which outputs pulses for the main control board of the client to monitor a certain parameter of the motor;
   an Ethernet LAN module which supports common TCP/IP protocols, and is configured to connect the motor control module to bring the motor control module under building network control or remotely control and monitor the parameter status of the motor through the Internet;
   a Human Machine Interface (HMI) function module which is provided with a basic monochrome HMI or an advanced high-definition color screen according to market segmentation, allowing users to control the motor directly, to control the speed/torque/air flow of the motor in real time or to perform configuration and diagnosis, and HMI function module can even be used in laboratory tests; and
   a dip switch module which is connected to the motor control module by connectors, and several dip switches are provided in a row for users to change the parameters of the motor in real time.

6. The device of claim 5, wherein that the first function module, the second function module, the third function module, the fourth function module, and the fifth function module are connected by mutually matched connectors means that the function modules get close together by plugging male connectors into female connectors to save space.

7. The device of claim 6, wherein all function modules are lined up and then installed on a din rail, and are connected together by flexible flat cables, allowing users to arrange the function modules vertically or horizontally or to distribute the function modules in different positions.

8. The device of claim 5, wherein function modules are fixed on a base in which a second circuit board is provided for power supply and control signal transmission between the function modules.

9. The device of claim 8, wherein there are two second function modules which control two motor bodies to form a motor controller of an indoor unit or an outdoor unit respectively.

10. The device of claim 8, wherein one or more backup function modules serve as backups for the power module, the motor control module, and the I/O module.

11. The device of claim 5, wherein that the first function module, the second function module, the third function module, the fourth function module and the fifth function module are connected by mutually matched connectors means that the function modules get close together by plugging male connectors into female connectors to save space.

12. A method, comprising subdividing a motor controller into a plurality of function modules, and the plurality of function modules comprising:
   a first function module, comprising at least one power module connected to the mains supply to output a corresponding DC power supply to power other modules;
   a second function module, comprising at least one motor control module comprising a microprocessor control unit (MCU) and an IGBT inverter, wherein one motor control module controls one motor body, and the motor control module powered by the VDC power supply is configured to receive external input control signals and output power to the motor body, so as to control speed or torque or air flow of the motor body; and
   a third function module, comprising at least one an I/O module configured to transmit signals between a system main control board or a peripheral device and the motor control module;
   the at least one power module, the at least one motor control module and the at least one I/O module matched with parameters for controlling motors are selected, combined, and connected together to form a combined motor controller.

13. The method of claim 12, wherein the plurality of function modules further comprises:
   a fourth function module, comprising a redundancy control module configured to automatically enable a backup function module when the first function module, the second function module or the third function module fails, so as to ensure that a client system can still operate smoothly;
   a fifth function module, comprising the backup function module having the same function as the first function module, the second function module or the third function module, wherein one or more backup function modules are provided to meet the customer needs, and the above function modules are combined to form a motor control unit; and
   the first function module, the second function module, the third function module, the fourth function module and the fifth function module are all provided with an independent metal or plastic shell and a first circuit board located in the shell, and are connected by mutually matched connectors.

14. The method of claim 13, wherein the at least one I/O module is subdivided into multiple types depending on functions, and at least one of following I/O modules is selected for combinations according to requirements:
- a multi-position 24 VAC input module which receives a 24 VAC position signal from a main control board of a client and transmits the signal to the motor control module;
- a PWM input module which receives a PWM signal from the main control board of the client and transmits the signal to the motor control module;
- a 0-10 VDC input module which receives a 0-10 VDC signal from the main control board of the client and transmits the signal to the motor control module;
- a serial communication module based on RS485 which requires the motor control module to be provided with corresponding drivers to be compatible with different communication protocols;
- a Bluetooth wireless communication module which allows users to communicate wirelessly with the motor control module through a mobile App or a PC for configuration and diagnosis;
- a pulse output module which outputs pulses for the main control board of the client to monitor a certain parameter of the motor;
- an Ethernet LAN module which supports common TCP/IP protocols, and is configured to connect the motor control module to bring the motor control module under building network control or remotely control and monitor the parameter status of the motor through the Internet;
- a Human Machine Interface (HMI) function module which is provided with a basic monochrome HMI or an advanced high-definition color screen according to the market segmentation, allowing users to control the motor directly, to control the speed/torque/air flow of the motor in real time or to perform configuration and diagnosis, and the HMI function module can even be used in laboratory tests; and
- a dip switch module which is connected to the motor control module by connectors, and several dip switches are provided in a row for users to change the parameters of the motor in real time.

15. The method of claim 14, wherein that the first function module, the second function module, the third function module, the fourth function module and the fifth function module are connected by mutually matched connectors means that the function modules are flexibly arranged in different positions and connected by flexible flat cables; each function module is a rectangular shell of uniform height and depth and different width; and all the function modules are lined up leaving no gap between two adjacent modules and then installed on a din rail.

16. The method of claim 15, wherein that the first function module, the second function module, the third function module, the fourth function module and the fifth function module are connected by mutually matched connectors means that the function modules are flexibly arranged in different positions and connected by flexible flat cables; and all the function modules are fixed on a base designed as a purely mechanical mounting base.

17. The method of claim 16, wherein all the function modules are fixed on a base designed as a purely mechanical mounting base, and a bus interface is additionally provided on the purely mechanical mounting base for power supply or control signal transmission between the function modules.

* * * * *